(12) United States Patent
Adams et al.

(10) Patent No.: US 9,216,751 B2
(45) Date of Patent: Dec. 22, 2015

(54) CLEANING CART

(71) Applicant: Unger Marketing International, LLC, Bridgeport, CT (US)

(72) Inventors: Paul Adams, Monroe, CT (US); Raymond E. Clepper, Brooklyn, NY (US); Joseph K. Patterson, Monroe, CT (US)

(73) Assignee: UNGER MARKETING INTERNATIONAL, LLC, Bridgeport, CT (US)

( * ) Notice: Subject to any disclaimer, the term of this patent is extended or adjusted under 35 U.S.C. 154(b) by 0 days.

(21) Appl. No.: 14/313,826

(22) Filed: Jun. 24, 2014

(65) Prior Publication Data
US 2014/0375004 A1 Dec. 25, 2014

Related U.S. Application Data

(63) Continuation of application No. 29/478,334, filed on Jan. 3, 2014.

(60) Provisional application No. 61/838,463, filed on Jun. 24, 2013.

(51) Int. Cl.
*B62B 3/00* (2006.01)

(52) U.S. Cl.
CPC ....................................... *B62B 3/005* (2013.01)

(58) Field of Classification Search
CPC .......... B62B 3/00; B62B 3/002; B62B 3/005; B62B 3/007; B62B 3/008; B62B 3/04; B62B 3/10; B62B 3/102; B62B 3/104

USPC .......... 280/47.34, 47.35, 33.991, 79.11, 79.2, 280/35

See application file for complete search history.

(56) References Cited

U.S. PATENT DOCUMENTS

| 1,176,978 A | 3/1916 | Parker |
| 1,491,251 A | 4/1924 | Webb |

(Continued)

FOREIGN PATENT DOCUMENTS

| DE | 9307792 | 4/1993 |
| DE | 202004003525 | 7/2004 |

(Continued)

OTHER PUBLICATIONS

International Search Report dated Nov. 4, 2014 corresponding to PCT Application No. PCT/US2014043927, 2 Pages.

(Continued)

*Primary Examiner* — John Walters
(74) *Attorney, Agent, or Firm* — Ohlandt, Greeley, Ruggiero & Perle, LLP

(57) ABSTRACT

A cleaning cart is provided that includes a base, a plurality of wheels and a storage region depending from the base, and a bucket restraining device. The base has a first side wall, a second side wall, and a front wall, the base having at least one portion configured to receive a bucket thereon. The bucket restraining device has a lateral restraining wall and a rear restraining wall that cooperate to define a first restraining region and a second restraining region. The first restraining region is defined by the first side wall, the front wall, the lateral restraining wall, and a portion of the rear restraining wall. The second restraining region is defined by the second side wall, the front wall, the lateral restraining wall, and a different portion of rear restraining wall.

29 Claims, 19 Drawing Sheets

(56) References Cited

U.S. PATENT DOCUMENTS

| | | | |
|---|---|---|---|
| 2,424,644 A | 7/1947 | Barrett | |
| 2,596,749 A | 5/1952 | Webber | |
| 2,865,647 A | 12/1958 | Wilson | |
| 3,105,617 A | 10/1963 | Felldin | |
| 3,162,462 A | 12/1964 | Elders | |
| 3,401,420 A | 9/1968 | Lofgren | |
| 3,453,001 A | 7/1969 | Wellington et al. | |
| 3,504,392 A | 4/1970 | Baek | |
| 3,874,531 A | 4/1975 | Mayo | |
| 4,165,088 A | 8/1979 | Nelson | |
| 4,174,977 A | 11/1979 | Shallenberg et al. | |
| 4,362,199 A | 12/1982 | Futerman | |
| D273,242 S | 3/1984 | Maza et al. | |
| D275,044 S | 8/1984 | Hampshire et al. | |
| 4,493,482 A | 1/1985 | Valenti et al. | |
| 4,499,599 A | 2/1985 | Polett et al. | |
| 4,524,457 A | 6/1985 | Marino | |
| 4,596,040 A | 6/1986 | LaFleur et al. | |
| 4,603,432 A | 7/1986 | Marino | |
| 4,610,028 A | 9/1986 | Nattrass | |
| 4,703,517 A | 10/1987 | Marino | |
| 4,730,642 A | 3/1988 | Surkamp et al. | |
| 4,743,040 A | 5/1988 | Breveglieri et al. | |
| 4,790,029 A | 12/1988 | LaFleur et al. | |
| D302,064 S | 7/1989 | Delmerico | |
| 4,869,518 A | 9/1989 | Breveglieri et al. | |
| 4,923,202 A * | 5/1990 | Breveglieri et al. | 280/47.35 |
| D309,813 S | 8/1990 | Gingras | |
| D321,071 S | 10/1991 | Dickinson | |
| 5,056,860 A | 10/1991 | Cornacchia et al. | |
| 5,089,037 A | 2/1992 | Marsolais | |
| 5,104,236 A | 4/1992 | LaFleur | |
| 5,127,893 A | 7/1992 | LaFleur | |
| D330,103 S | 10/1992 | Andrews, Jr. et al. | |
| 5,326,117 A | 7/1994 | Cook | |
| 5,340,217 A | 8/1994 | Rothman | |
| 5,377,833 A | 1/1995 | Ranger | |
| 5,380,033 A | 1/1995 | Harling | |
| 5,415,614 A | 5/1995 | Nattrass | |
| D360,725 S | 7/1995 | Snell | |
| D361,186 S | 8/1995 | Kowalski et al. | |
| D361,187 S | 8/1995 | Snell | |
| D361,188 S | 8/1995 | Perelli | |
| D361,419 S | 8/1995 | Snell | |
| D361,643 S | 8/1995 | Snell | |
| 5,518,314 A | 5/1996 | Kawafuchi et al. | |
| 5,556,205 A | 9/1996 | Gallie et al. | |
| D374,323 S | 10/1996 | Carlson et al. | |
| 5,564,833 A | 10/1996 | Proffitt | |
| 5,566,961 A | 10/1996 | Snell et al. | |
| 5,607,237 A | 3/1997 | LaFleur | |
| D379,705 S | 6/1997 | Delmerico et al. | |
| D381,168 S | 7/1997 | Delmerico et al. | |
| 5,704,496 A * | 1/1998 | Latta | 211/70.6 |
| D391,032 S | 2/1998 | Delmerico | |
| D395,108 S | 6/1998 | Pool | |
| 5,810,478 A | 9/1998 | LaFleur | |
| D400,334 S | 10/1998 | Hawkins | |
| D401,712 S | 11/1998 | Daniels | |
| 5,881,891 A * | 3/1999 | Murphy, Jr. | 211/70.6 |
| 5,887,878 A | 3/1999 | Tisbo et al. | |
| 5,913,528 A | 6/1999 | Kresse et al. | |
| 5,915,723 A | 6/1999 | Austin | |
| D415,867 S | 10/1999 | Perelli | |
| D415,868 S | 10/1999 | Hewitt | |
| 5,975,544 A | 11/1999 | Kresse et al. | |
| 6,010,245 A | 1/2000 | Ross et al. | |
| D423,177 S | 4/2000 | Gaffney et al. | |
| D424,773 S | 5/2000 | Granberg | |
| D425,279 S | 5/2000 | Houry et al. | |
| 6,086,073 A | 7/2000 | Tisbo et al. | |
| 6,109,785 A | 8/2000 | Ross et al. | |
| 6,145,927 A | 11/2000 | Lo | |
| 6,206,980 B1 | 3/2001 | Robinson | |
| 6,213,483 B1 | 4/2001 | Gaffney | |
| 6,305,845 B1 | 10/2001 | Navin | |
| 6,415,927 B1 | 7/2002 | Stone et al. | |
| 6,467,955 B1 | 10/2002 | Kim | |
| 6,478,463 B2 | 11/2002 | Snider | |
| 6,494,103 B1 | 12/2002 | Loong | |
| 6,497,423 B1 | 12/2002 | Perelli et al. | |
| D469,235 S | 1/2003 | Calmeise et al. | |
| D474,570 S | 5/2003 | Presnell et al. | |
| 6,572,123 B2 | 6/2003 | Calmeise et al. | |
| D478,199 S | 8/2003 | Presnell et al. | |
| D481,188 S | 10/2003 | DiGiacomo, Jr. et al. | |
| D481,189 S | 10/2003 | Van Landingham, Jr. | |
| D481,847 S | 11/2003 | Van Landingham, Jr. | |
| D482,173 S | 11/2003 | Van Landingham, Jr. | |
| D484,664 S | 12/2003 | Arceta | |
| D484,667 S | 12/2003 | Van Landingham, Jr. | |
| D485,037 S | 1/2004 | Presnell et al. | |
| D485,410 S | 1/2004 | Van Landingham, Jr. | |
| 6,688,471 B2 | 2/2004 | Stone et al. | |
| D487,604 S | 3/2004 | Van Landingham, Jr. | |
| 6,739,605 B2 | 5/2004 | Calmeise et al. | |
| 6,827,357 B2 * | 12/2004 | Calmeise et al. | 280/47.34 |
| 6,860,494 B1 | 3/2005 | Chisholm | |
| D504,259 S | 4/2005 | Arceta | |
| D504,260 S | 4/2005 | Arceta | |
| D510,784 S | 10/2005 | Van Landingham, Jr. | |
| D510,888 S | 10/2005 | Kovach | |
| 7,063,397 B2 | 6/2006 | Sabounjian | |
| D528,729 S | 9/2006 | Van Landingham, Jr. | |
| 7,104,556 B1 | 9/2006 | Young | |
| D533,705 S | 12/2006 | Bertucci et al. | |
| 7,213,817 B2 | 5/2007 | Cheung | |
| 7,240,910 B2 | 7/2007 | Stuemke | |
| D555,869 S | 11/2007 | Zorzo | |
| D555,870 S | 11/2007 | Zorzo | |
| D556,416 S | 11/2007 | Zorzo | |
| D556,417 S | 11/2007 | Zorzo | |
| D556,418 S | 11/2007 | Zorzo | |
| D558,949 S | 1/2008 | Zorzo | |
| D559,496 S | 1/2008 | Zorzo | |
| 7,338,054 B2 | 3/2008 | Pint | |
| D572,424 S | 7/2008 | Presnell et al. | |
| D573,323 S | 7/2008 | Vargas | |
| 7,398,978 B2 | 7/2008 | Cheung | |
| D575,473 S | 8/2008 | Presnell et al. | |
| D575,922 S | 8/2008 | Presnell | |
| D578,269 S | 10/2008 | Van Landingham, Jr. | |
| 7,455,246 B2 | 11/2008 | Roth et al. | |
| D582,621 S | 12/2008 | Girard | |
| D582,836 S | 12/2008 | Harvey et al. | |
| 7,467,801 B1 | 12/2008 | Garduno | |
| 7,472,456 B2 | 1/2009 | Moore et al. | |
| D588,322 S | 3/2009 | Tilk et al. | |
| D594,170 S | 6/2009 | Catron | |
| D598,623 S | 8/2009 | Zang Wentz Pho | |
| D599,523 S | 9/2009 | Ambrefe, Jr. et al. | |
| D600,423 S | 9/2009 | Presnell | |
| D600,872 S | 9/2009 | Phillips | |
| D607,172 S | 12/2009 | Catron | |
| D608,071 S | 1/2010 | Presnell | |
| 7,648,147 B2 | 1/2010 | Lauer et al. | |
| 7,681,728 B2 | 3/2010 | Sabounjian | |
| D617,074 S | 6/2010 | Presnell | |
| D618,419 S | 6/2010 | Catron et al. | |
| D624,269 S | 9/2010 | Uhl et al. | |
| D624,270 S | 9/2010 | Uhl et al. | |
| D624,271 S | 9/2010 | Uhl et al. | |
| D624,724 S | 9/2010 | Uhl et al. | |
| 7,798,712 B2 | 9/2010 | Russick | |
| 7,806,426 B2 | 10/2010 | Van Landingham, Jr. et al. | |
| D629,581 S | 12/2010 | Smith | |
| 7,857,329 B2 | 12/2010 | Cai | |
| D632,043 S | 2/2011 | Rouillard et al. | |
| D640,436 S | 6/2011 | Perelli et al. | |
| D643,990 S | 8/2011 | Rouillard et al. | |
| 7,988,160 B2 | 8/2011 | Lindner et al. | |
| 7,992,879 B2 | 8/2011 | Eisenberg et al. | |
| 8,070,181 B2 | 12/2011 | Forrest et al. | |
| 8,081,974 B2 | 12/2011 | Fischer et al. | |

(56) References Cited

U.S. PATENT DOCUMENTS

| | | | |
|---|---|---|---|
| D659,340 S | 5/2012 | Rouillard et al. | |
| D661,997 S | 6/2012 | Wilcoxen et al. | |
| D661,998 S | 6/2012 | Wilcoxen et al. | |
| 8,202,000 B2 | 6/2012 | Russick | |
| 8,209,995 B2 | 7/2012 | Kieling et al. | |
| D667,602 S | 9/2012 | Salmon | |
| 8,333,278 B2 | 12/2012 | Smith | |
| D678,645 S | 3/2013 | Rouillard et al. | |
| 8,408,564 B2 | 4/2013 | Hutchinson | |
| 8,419,024 B1* | 4/2013 | Arroyo-Ferrer | 280/47.35 |
| 8,459,489 B2 | 6/2013 | Potts et al. | |
| D692,314 S | 10/2013 | Wilcoxen et al. | |
| 8,702,054 B2 | 4/2014 | Lindner et al. | |
| 2002/0008417 A1 | 1/2002 | Holst et al. | |
| 2002/0030337 A1 | 3/2002 | Calmeise et al. | |
| 2003/0122331 A1 | 7/2003 | DiGiacomo, Jr. et al. | |
| 2003/0217428 A1 | 11/2003 | Perelli | |
| 2004/0217238 A1 | 11/2004 | Chochinov et al. | |
| 2004/0227315 A1 | 11/2004 | Van Landingham, Jr. | |
| 2005/0011037 A1 | 1/2005 | Zhao et al. | |
| 2005/0023786 A1 | 2/2005 | Delmerico | |
| 2005/0062246 A1 | 3/2005 | Kang | |
| 2005/0248109 A1 | 11/2005 | Chang | |
| 2005/0280228 A1 | 12/2005 | Fernandes et al. | |
| 2006/0102231 A1 | 5/2006 | Schiller et al. | |
| 2007/0025647 A1 | 2/2007 | Hamlin | |
| 2007/0177925 A1 | 8/2007 | Perelli | |
| 2007/0182114 A1 | 8/2007 | Fernandes et al. | |
| 2007/0210546 A1 | 9/2007 | Presnell et al. | |
| 2007/0267832 A1 | 11/2007 | Denissov | |
| 2007/0289788 A1 | 12/2007 | Salmon | |
| 2008/0029981 A1 | 2/2008 | Dukes | |
| 2008/0093813 A1 | 4/2008 | Kemp et al. | |
| 2008/0174214 A1 | 7/2008 | Segall et al. | |
| 2008/0295870 A1 | 12/2008 | Perelli et al. | |
| 2008/0302585 A1 | 12/2008 | Perelli et al. | |
| 2009/0052974 A1 | 2/2009 | Treacy | |
| 2009/0189498 A1* | 7/2009 | Catron et al. | 312/249.8 |
| 2010/0002960 A1 | 1/2010 | Lasko | |
| 2010/0066045 A1 | 3/2010 | Presnell et al. | |
| 2010/0283227 A1 | 11/2010 | Perelli et al. | |
| 2011/0064334 A1 | 3/2011 | Sormus et al. | |
| 2011/0121530 A1 | 5/2011 | Young | |
| 2011/0133417 A1* | 6/2011 | Rouillard et al. | 280/35 |
| 2011/0169249 A1 | 7/2011 | Lindner et al. | |
| 2011/0268374 A1 | 11/2011 | Hotta et al. | |
| 2011/0284026 A1 | 11/2011 | Taylor et al. | |
| 2012/0018330 A1 | 1/2012 | Kato et al. | |
| 2012/0061930 A1 | 3/2012 | Lin | |
| 2012/0266628 A1 | 10/2012 | Kieling et al. | |
| 2012/0312390 A1 | 12/2012 | Olson et al. | |
| 2012/0317747 A1 | 12/2012 | Taylor et al. | |
| 2013/0033014 A1 | 2/2013 | Yang | |
| 2013/0038032 A1 | 2/2013 | Long et al. | |
| 2013/0069325 A1 | 3/2013 | Wallace | |

FOREIGN PATENT DOCUMENTS

| | | | |
|---|---|---|---|
| EP | 1151907 A1 | 11/2001 | |
| EP | 1437283 B1 | 7/2004 | |
| FR | 2833913 | 6/2003 | |
| JP | 2005335030 A * | 12/2005 | B25H 3/00 |
| WO | 9500063 | 1/1995 | |
| WO | 9900050 | 1/1999 | |
| WO | 02051686 A1 | 7/2002 | |
| WO | 2010112858 A1 | 10/2010 | |

OTHER PUBLICATIONS

International Written Opinion dated Nov. 4, 2014 corresponding to PCT Application No. PCT/US2014043927, 4 Pages.

* cited by examiner

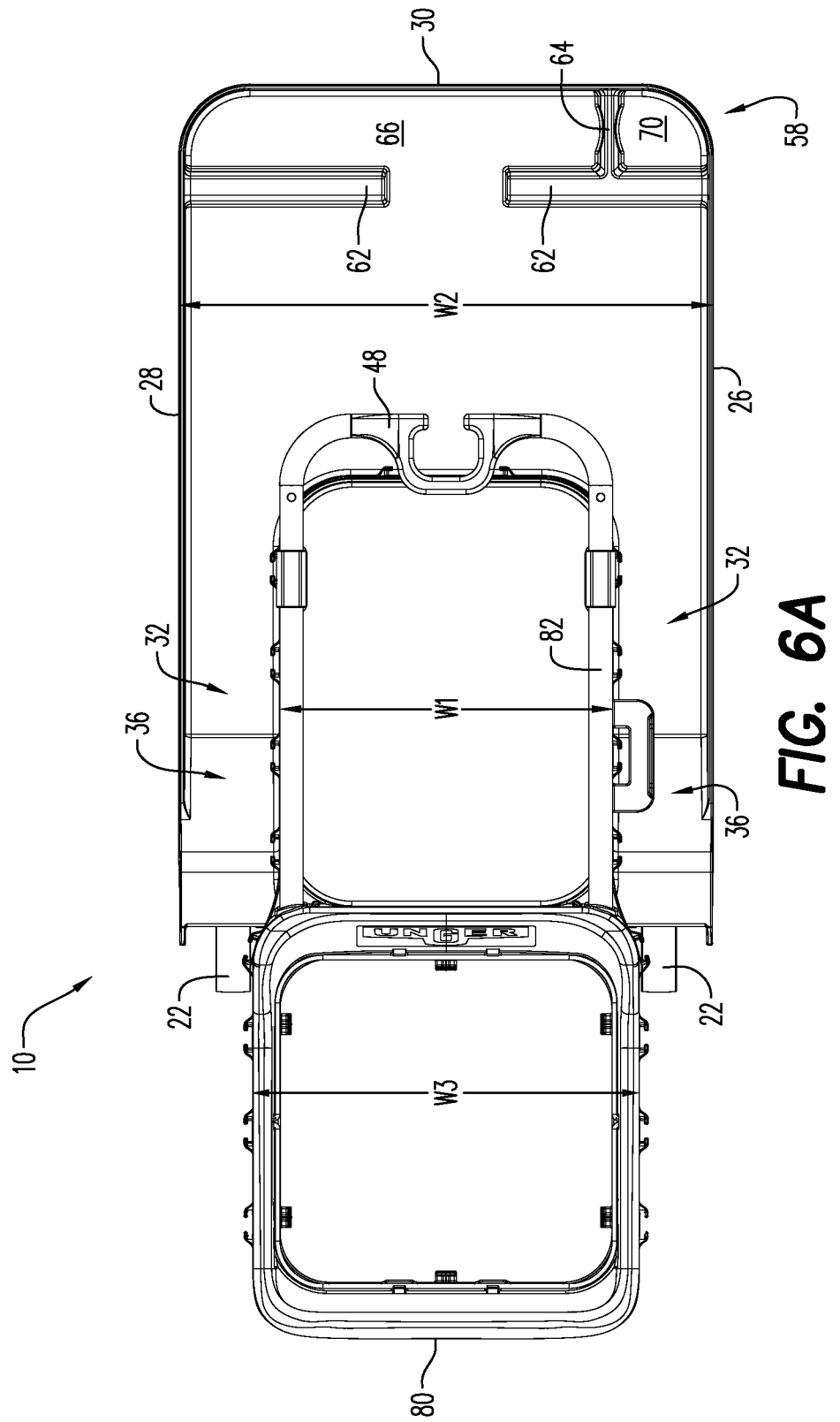

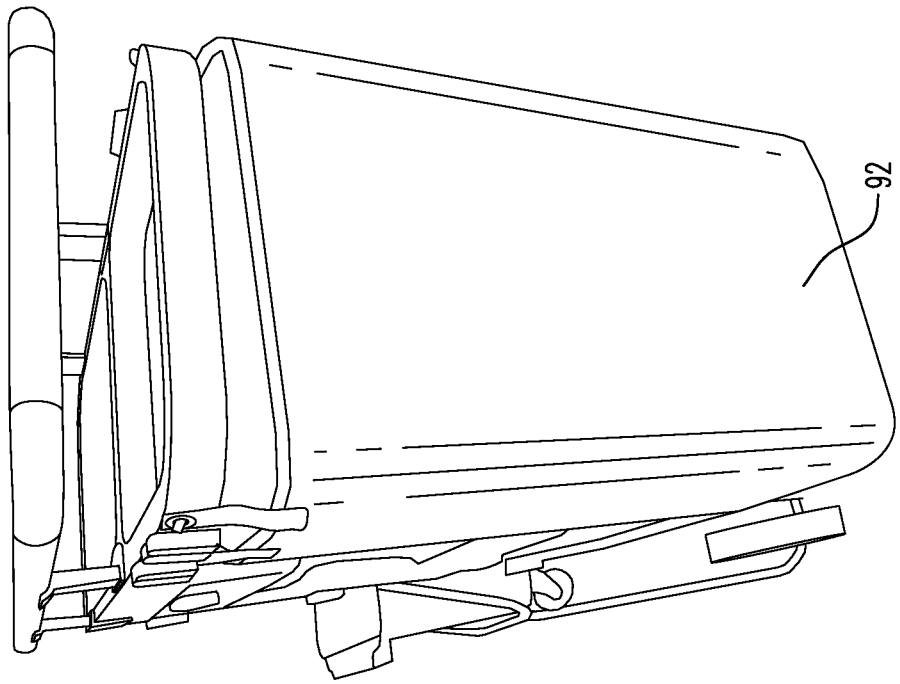
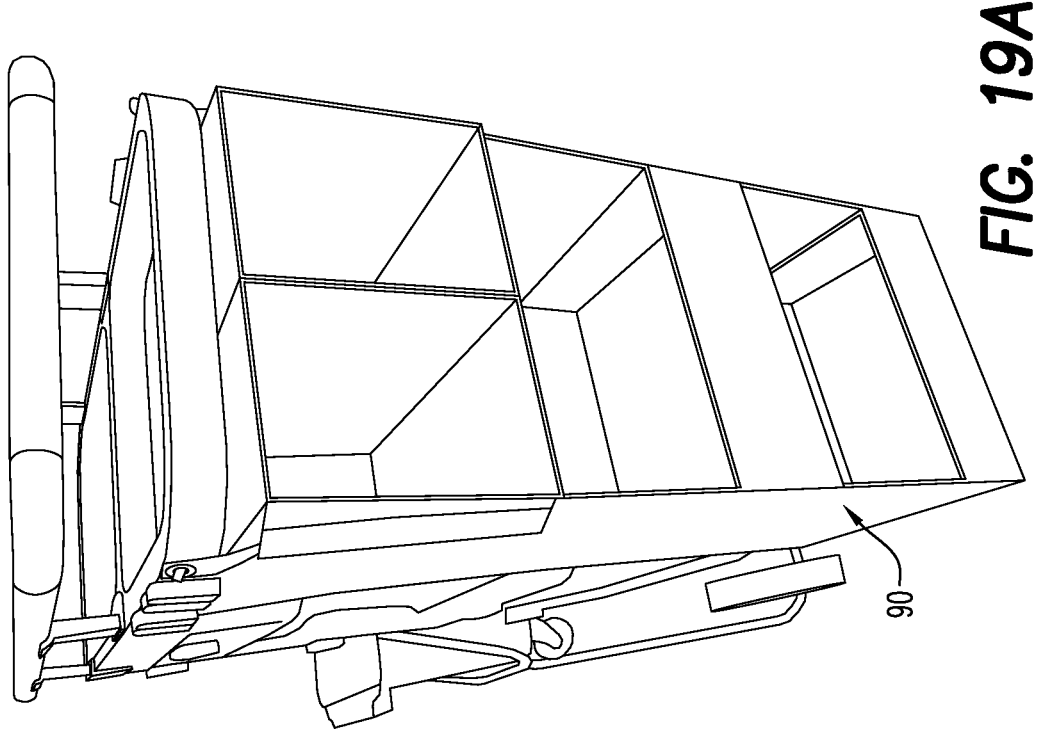
FIG. 19A
FIG. 19B

CLEANING CART

CROSS REFERENCE TO RELATED APPLICATIONS

This application claims the benefit of U.S. Provisional Application Ser. No. 61/838,463, filed Jun. 24, 2013 and is a continuation of Ser. No. 29/478,334, filed on Jan. 3, 2014, the entire contents of each of which are incorporated by reference herein.

BACKGROUND OF THE INVENTION

1. Field of the Invention

The present disclosure is related to cleaning carts that have improved ease of use, reduced noise when moving, improved passage through narrow openings, and prevents leaks of dirt and debris on tools held by the cart.

2. Description of Related Art

Cleaning carts, namely carts used by cleaning personnel to transport cleaning chemicals, cleaning tools, trash collection, and various supplies are currently in use. Such carts are used in industrial and commercial cleaning environments such as, but not limited hotels, schools, office buildings, and the like.

It has been determined by the present disclosure that such prior art cleaning carts can be difficult for the operator to use, can be noisy when moving, can be difficult to move through narrow openings, and can allow dirt and debris from tools stored on the cart to leak or drop onto clean surfaces.

Accordingly, there is a need for cleaning carts that overcome, alleviate, and/or mitigate one or more of the aforementioned and other deleterious effects of prior art carts.

SUMMARY

A cleaning cart is provided that includes a base, a plurality of wheels and a storage region depending from the base, and a bucket restraining device. The base has a first side wall, a second side wall, and a front wall, the base having at least one portion configured to receive a bucket thereon. The bucket restraining device has a lateral restraining wall and a rear restraining wall that cooperate to define a first restraining region and a second restraining region. The first restraining region is defined by the first side wall, the front wall, the lateral restraining wall, and a portion of the rear restraining wall. The second restraining region is defined by the second side wall, the front wall, the lateral restraining wall, and a different portion of rear restraining wall.

A cleaning cart is also provided that includes a base and a plurality of wheels and a storage region depending from the base. The storage region has a main region with a first width and the base has a second width. The second width is larger than the first width to define a gutter on at least opposing sides of the storage region. In some embodiments, the gutter is further defined in front of the storage region.

A cleaning cart is also provided that includes a base, a plurality of wheels and a storage region depending from the base, and a plurality of tool holder openings, and a tool holder. The plurality of tool holder openings are on the base and the tool holder is removably securable in any one of the plurality of tool holder openings.

The above-described and other features and advantages of the present disclosure will be appreciated and understood by those skilled in the art from the following detailed description, drawings, and appended claims.

BRIEF DESCRIPTION OF THE DRAWINGS

FIG. 6a is a top view of the cleaning cart of FIG. 1;

FIGS. 19a, 19b, and 19c are views of a soft storage bag and a trash receptacle that are interchangeably used with the cart of FIG. 7, respectively;

DETAILED DESCRIPTION OF THE INVENTION

Figure 1:
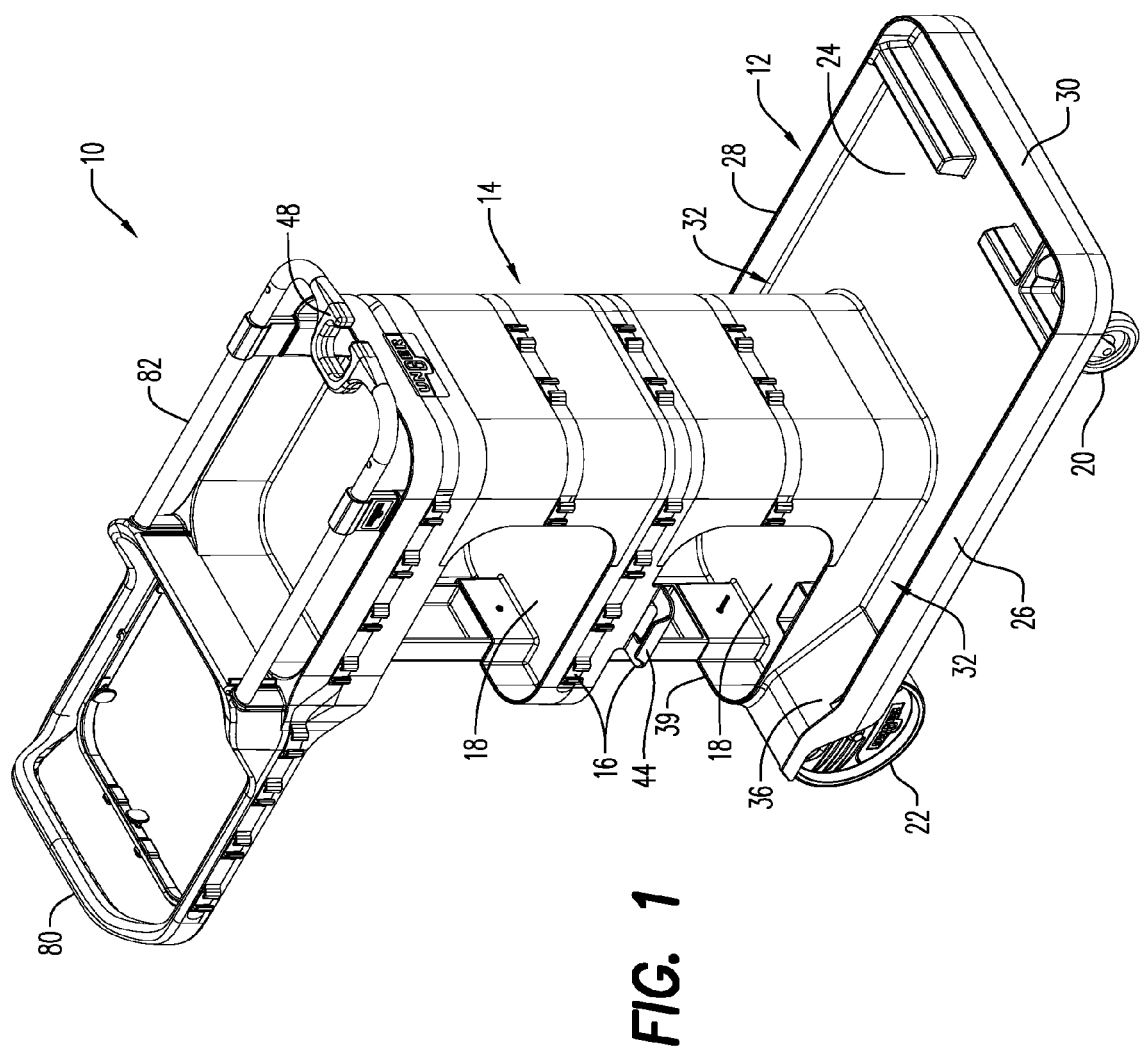
FIG. 1 is a top, side perspective view of a cleaning cart according to the present disclosure.
Figure 2:
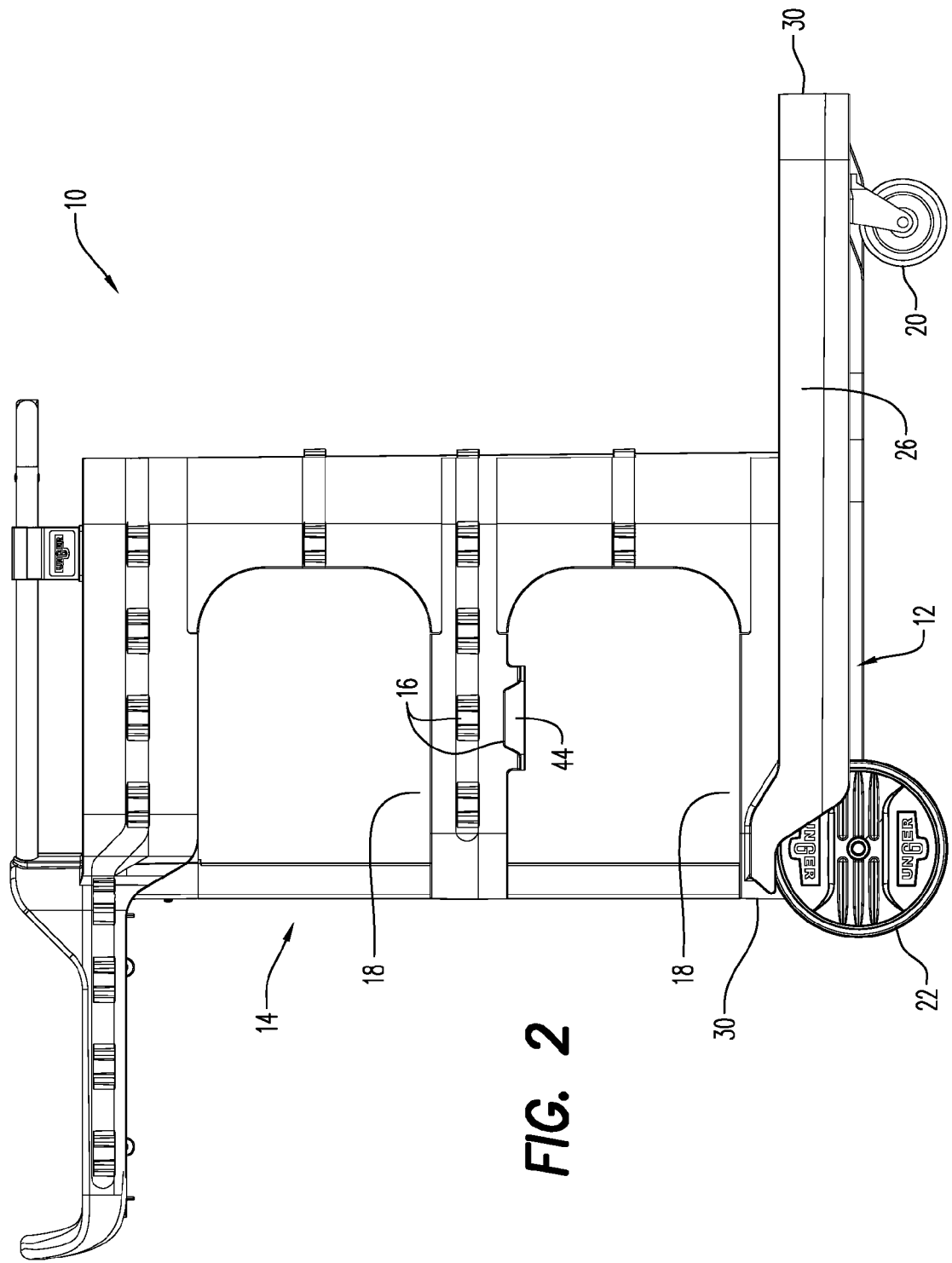
FIG. 2 is a first side view of the cleaning cart of FIG. 1.
Figure 3:
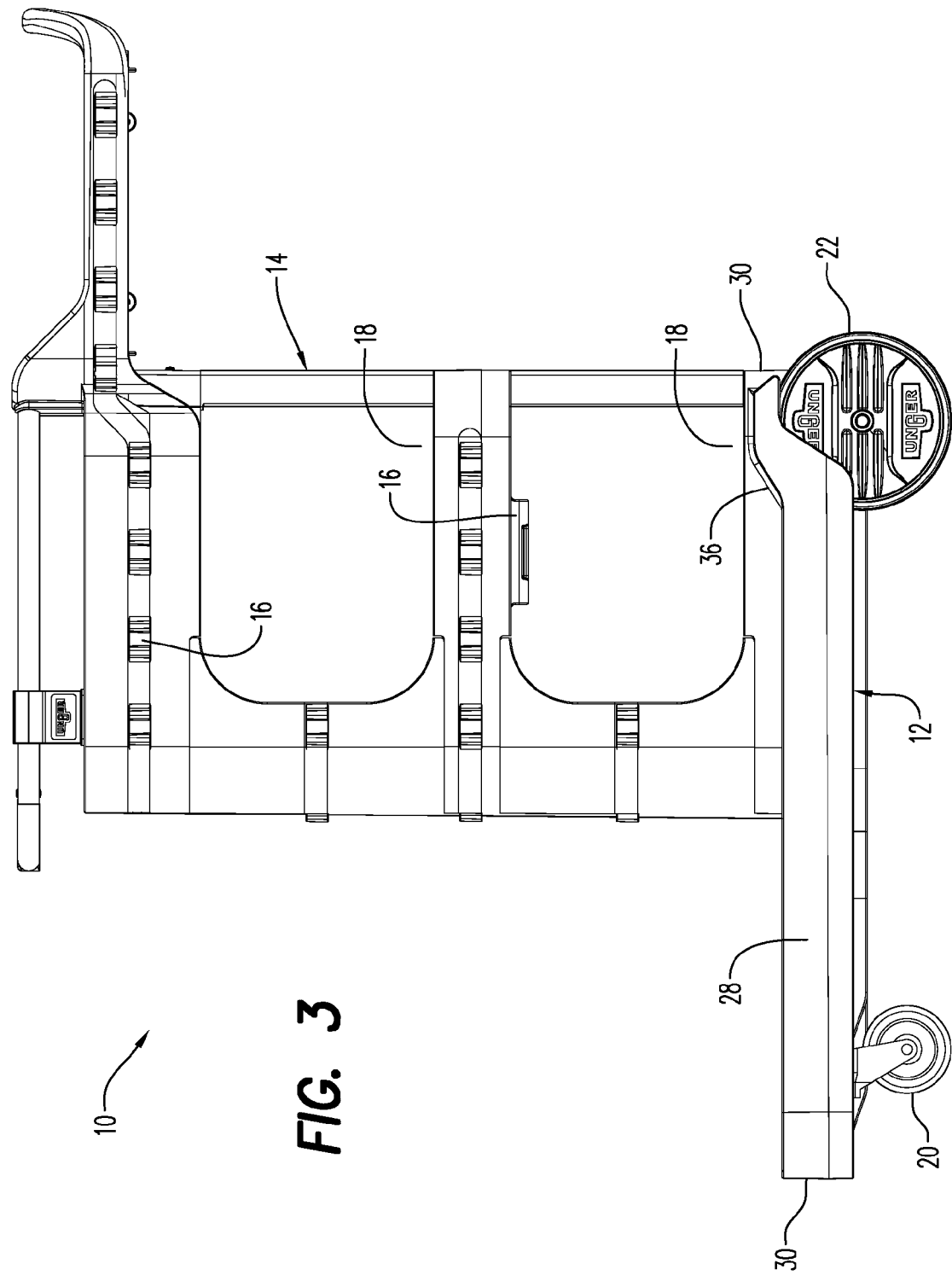
FIG. 3 is a second, opposite side view of the cleaning cart of FIG. 1.
Figure 4:
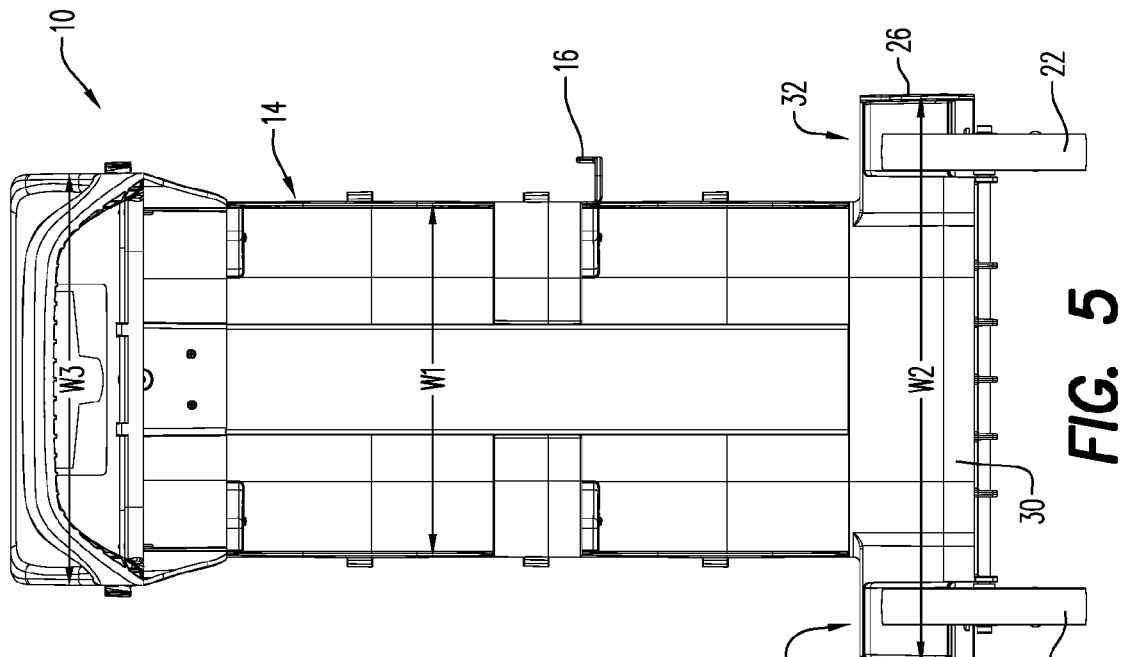
FIG. 4 is a front view of the cleaning cart of FIG. 1.
Figure 5:
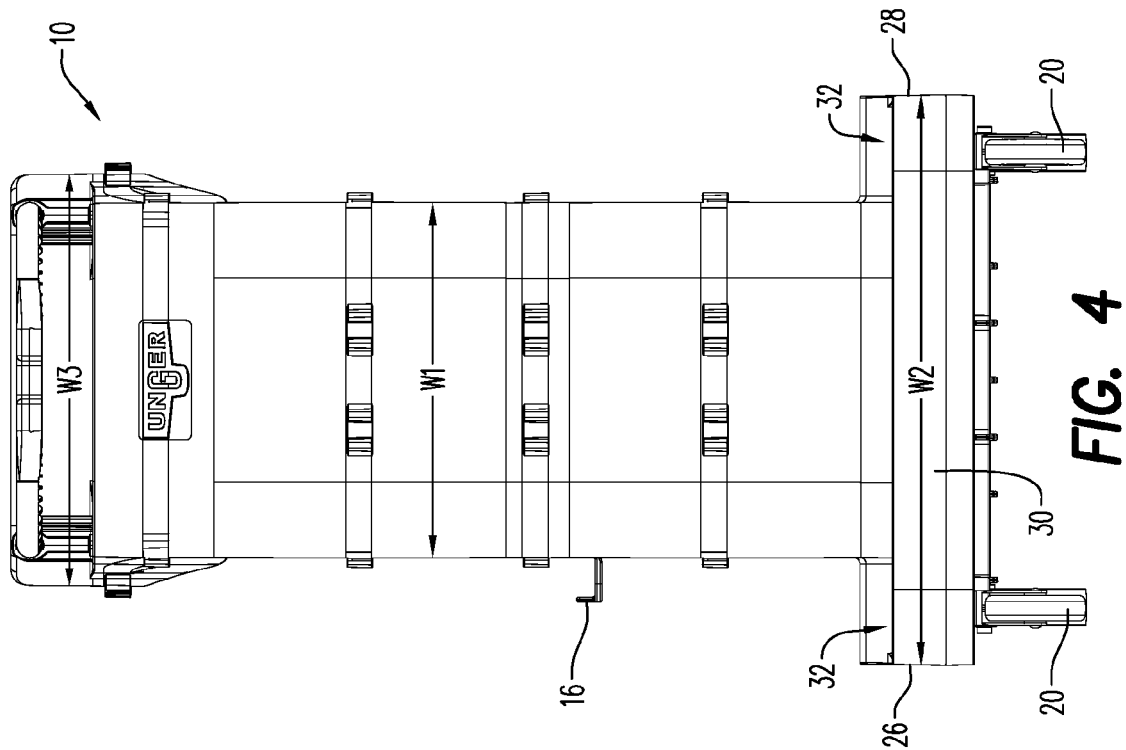
FIG. 5 is a rear view of the cleaning cart of FIG. 1.

Referring to the drawings and in particular to FIGS. 1 through 6, a first exemplary embodiment of a cleaning cart according to the present disclosure is shown and is generally referred to by reference numeral 10.

The cart 10 has a base 12 with a storage region 14. The storage region 14 includes a number of holders 16, which allows the user to store and transport cleaning tools and/or supplies (not shown) on the cart 10. The storage region 14 also has a number of shelves 18 for storage of cleaning supplies and the like. The base 12 has a set of front wheels 20 and a set of rear wheels 22. The base 12 is defined by a floor 24, a set of side walls 26, 28 and a front/back walls 30. The floor 24 slopes toward one of walls 30, preferably the front wall. In this way, the base 12 can capture or collect any fluid or dirt for easy cleaning. In some embodiments, cart 10 can include a removable drain plug at or near wall 30 to allow collected fluid to be drained from the cart, as well as to increase the ease of cleaning the cart.

In some embodiments, cart 10 has been configured so that the width $W_1$ of a main portion of the storage region 14 is less than the width $W_2$ of the base 12. The effect of this configuration is twofold.

First, the configuration of cart 10 allows any tool or supply held by holders 16 to remain primarily within the footprint of base 12. Stated another way, this configuration ensures that the widest part of cart 10 is base 12 even when tools and supplies are secured by holders 16. It has been determined by the present disclosure that prior art carts secure the tools and supplies on the outermost width, which results in problems trying to get those carts through doorways, elevator doors, and other narrow passageways. In contrast, cart 10 ensures that the widest part of the cart is base 12, even when tools and supplies are secured thereto, to allow ease of passage through doorways and other narrow passageways.

Second, the configuration of cart 10 results in a gutter 32 being formed at the base 12 between the storage region 14 and the side walls 26, 28. The gutter 32 is best seen in FIG. 6a.

Since the tools are secured to the holders 16 over this gutter 32, any dirt, water, or other debris that comes off the tools is captured in the gutter. This has been found to be particularly important by the present disclosure since, as the cart is moved around in normal use, it has been determined that the resultant vibration of the tools has a tendency to shake loose the dirt, water, or other debris, which is captured by gutter 32 to reduce the possibility of dirt or debris from getting on the floor. Preferably, gutter 32 is sloped in a desired direction such as towards wheels 20 to collect the dirt and debris in a desired region of base 12.

Additionally, cart 10 has been configured so that the width $W_3$ of a rear portion of the storage region 14 is wider that the main portion width $W_1$ but is smaller than the width $W_2$ of the base 12. More specifically, the rear portion of the storage region 14 extends in an opposite direction from the base 12 and is generally the region where a trash bag or soft storage compartment (described in detail below with respect to FIGS. 19 and 20) can be secured to the cart, both of which benefit from the additional width afforded by width $W_3$.

Cart 10 can include a push rail 80 at a rear end thereof and an upper rail 82 at storage region 14 as shown in FIGS. 1 and 6. Push rail 80 allows a user to maneuver or steer cart 10 as desired. Upper rail 82 forms an upper edge to the upper most shelf 18 to assist in keeping taller bottles or supplied in the car. Additionally, upper rail 82 extends forward from storage region 14 in the direction of front wall 30. It has been determined by the present disclosure that in this extended position, the upper rail 82 can be used by the operator pull the cart such as is typically required when passing through a door way that is being held open by the operator. Thus in this embodiment upper rail 82 further defines a pull handle for the cart 10.

Cart 10 is a modular cart in that tool holders 16 can be moved to different locations to suit the needs of the user and the tools and/or supplies with which the cart is used. It has been found that the modular configuration of cart 10 allows the user to ensure that the tools are securely retained on cart 10 with minimal noise or rattling when the cart is moved. An unintended consequence of configuring cart 10 with the width $W_1$ of the storage region 14 less than the width $W_2$ of the base 12 is a reduction in storage space for supplies. Advantageously, the modular configuration of cart 10 allows the user to recapture storage space by allowing the user to configure the cart 10 and its holders 16 in a manner that maximizes the usable space for their particular set of tools and supplies.

Turning now to FIGS. 7 through 11, cart 10 is shown in use with various tools and/or cleaning supplies 34. Additionally, cart 10 includes a sloped region 36 defined at wheels 22, which assists in guiding fluid and debris from the tools into gutter 32 as well as not allowing the debris to go off the back of the cart. Here, it can clearly be seen that all of the tools and supplies 34 remain substantially within the footprint of base 12 so that the widest part of cart 10 is base 12 even when tools and supplies are secured by holders 16.

The tools and/or cleaning supplies 34 used in combination with cart 10 can further include a mop bucket 56 as shown in FIGS. 6a, 6b, 6c, and 7.

In order to mitigate movement of mop bucket 56 on cart 10, the cart can include a tool holder 16 in the form of a bucket retaining device 58, best illustrated in FIG. 6a. Bucket retaining device 58 is configured to restrain wheels 60 of mop bucket 56.

Specifically, retaining device 58 includes portions of side walls 26, 28, front wall 30, a rear restraining wall 62 (shown in sections), and a lateral restraining wall 64.

Figure 6C:
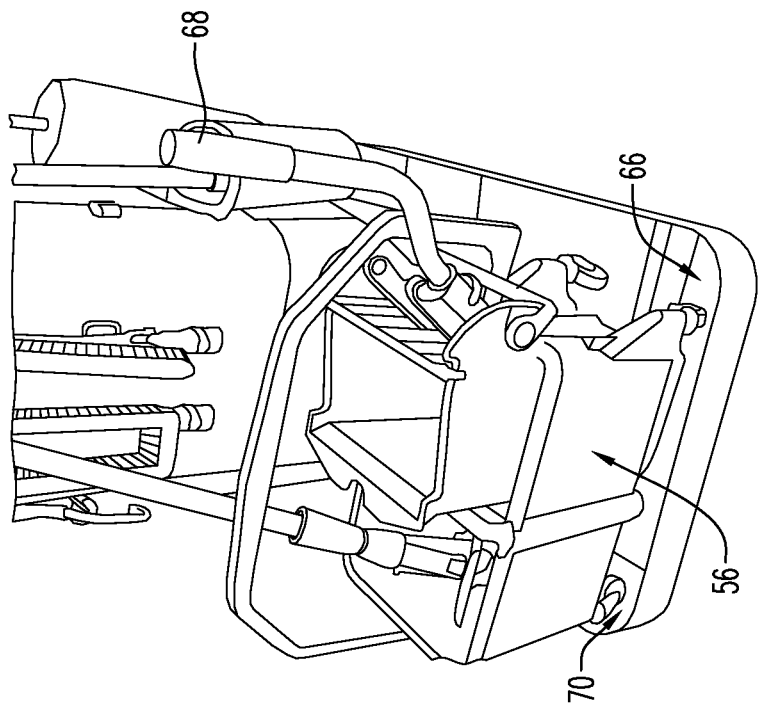
FIG. 6c is a view of a mop bucket in a first restraining region
Figure 6B:
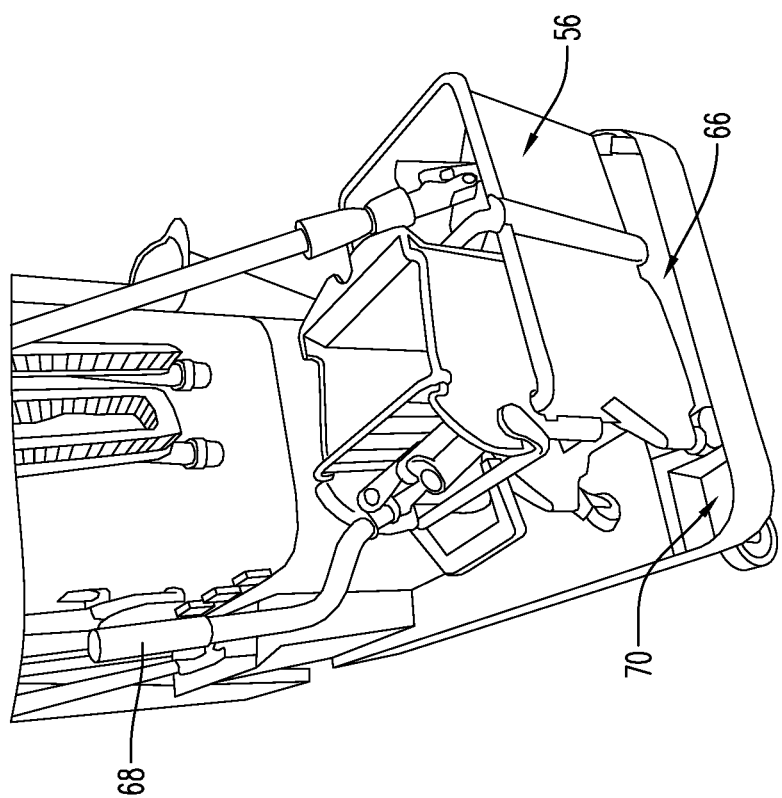
FIG. 6b is a view of a mop bucket in a first restraining region.

As such, restraining device 58 forms a first restraining region 66 formed by side wall 28, front wall 30, lateral restraining wall 64, and a portion of rear restraining wall 62. First restraining region 66 is sized and positioned to receive both front wheels 60 of bucket 56 as shown in FIG. 6b. In this position, the mop press handle 68 extends towards side wall 26 in a manner that mitigates extension of the handle from the footprint of base 12.

Additionally, restraining device 58 forms a second restraining region 70 formed by side wall 26, front wall 30, lateral restraining wall 64, and a different portion of rear restraining wall 62. Second restraining region 70 is sized and positioned to receive only one of the front wheels 60 of bucket 56 as shown in FIG. 6c. In this position, the mop press handle 68 extends towards side wall 28 in a manner that mitigates extension of the handle from the footprint of base 12.

Rear restraining wall 62 can have any desired configuration sufficient to form the first and second restraining regions 66, 70. For example, wall 62 is shown as having two sections. However, it is contemplated by the present disclosure for wall 62 to be a single, unitary wall or to have more than two sections.

Additionally, lateral restraining wall 64 is shown as being positioned in a single location. However, it is contemplated by the present disclosure for lateral restraining wall 64 to be movable to increase or decrease the size of restraining regions 66, 70, respectively, as needed to accommodate buckets 56 of differing sizes. Thus in some embodiments, cart 10 is configured so that the position of lateral restraining wall 64 can be adjusted to constrain buckets of differing sizes. Wall 64 is movable by the end user within one or more slots or protrusions incorporated into the mating walls to configure cart 10 to work with buckets having different sized wheels. Additionally, wall 64 can be removably held in place in a press, snap, interference, or friction fit manner.

Cart 10 is configured for use with holders 16 of various configurations to hold different types of tools and supplies. Generally, cart 10 and holders 16 have cooperating connectors that allow the holders to be removably placed at any desired location on the cart. In some embodiments, the tool holders 16 can also have an extended surface 73 (shown in FIG. 16a) with a label, icon and/or name of the tool that the holder is configured to hold such that when the tool holder is moved to another location on the cart 10 the label, icon and/or name of the tool is automatically relocated with the tool holder. Alternately, the label, icon and/or name of the tool that the holder is configured to hold can be separate from holder 16, but can be moved to any location on cart 10.

Figure 8:
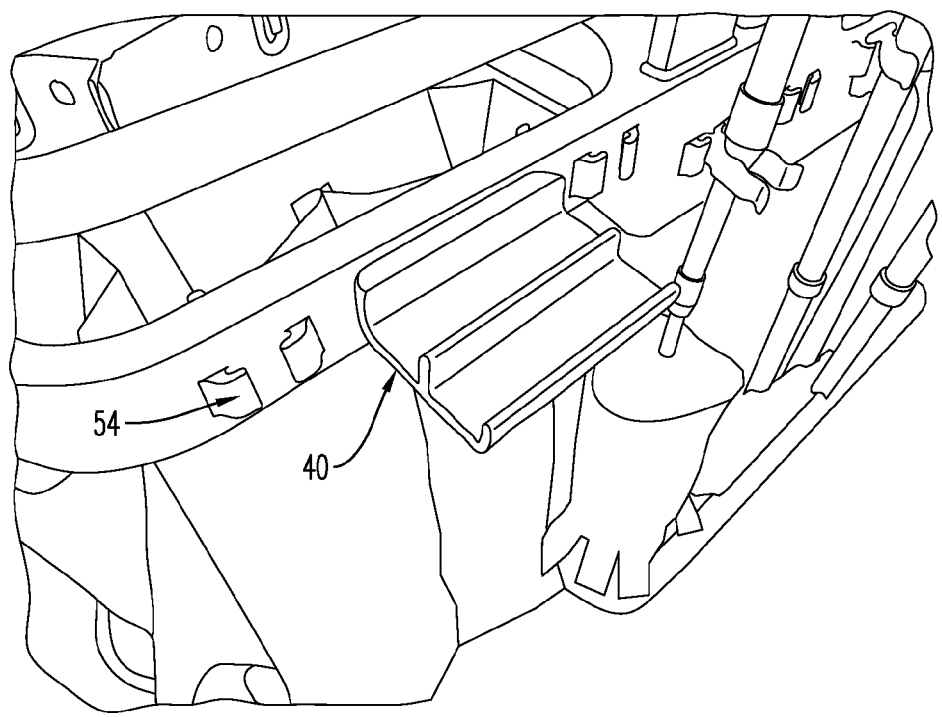
FIG. 8 is a close up view of a sign holder portion of the cart of FIG. 7 without signs loaded thereon.
Figure 9:
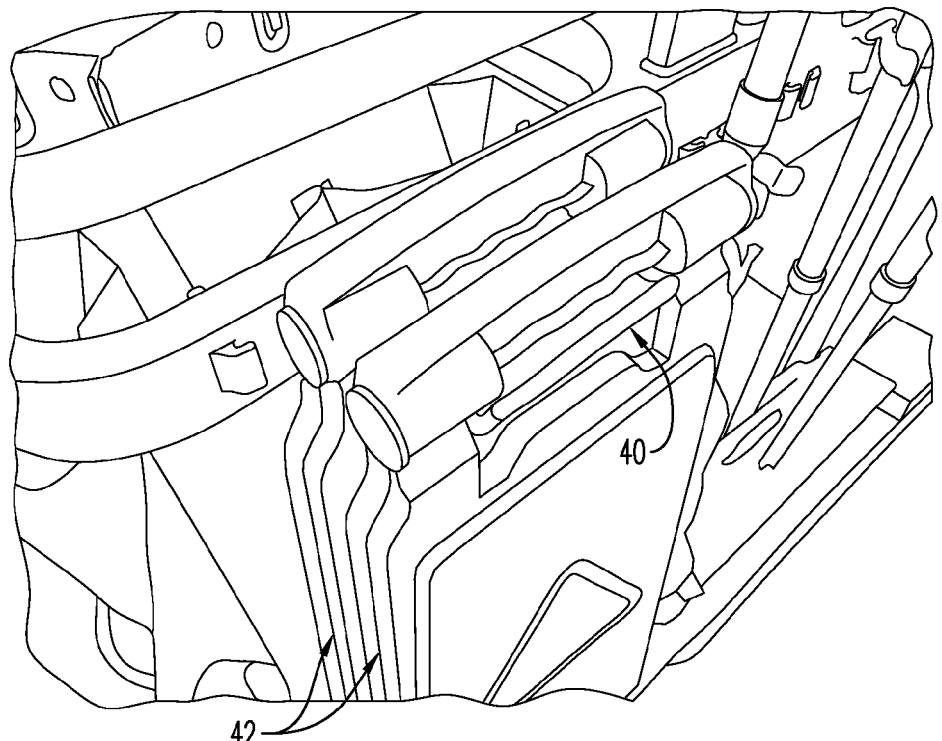
FIG. 9 is a close up view of the sign holder portion of FIG. 7 having two signs loaded thereon.

For example, a first type of holder 16 is shown in FIGS. 8 and 9, where the holder is a sign holder portion 40 of the cart. The sign holder portion 40 is shown in FIG. 8 without signs loaded thereon and in FIG. 9 with two signs 42 loaded thereon.

Figure 10:
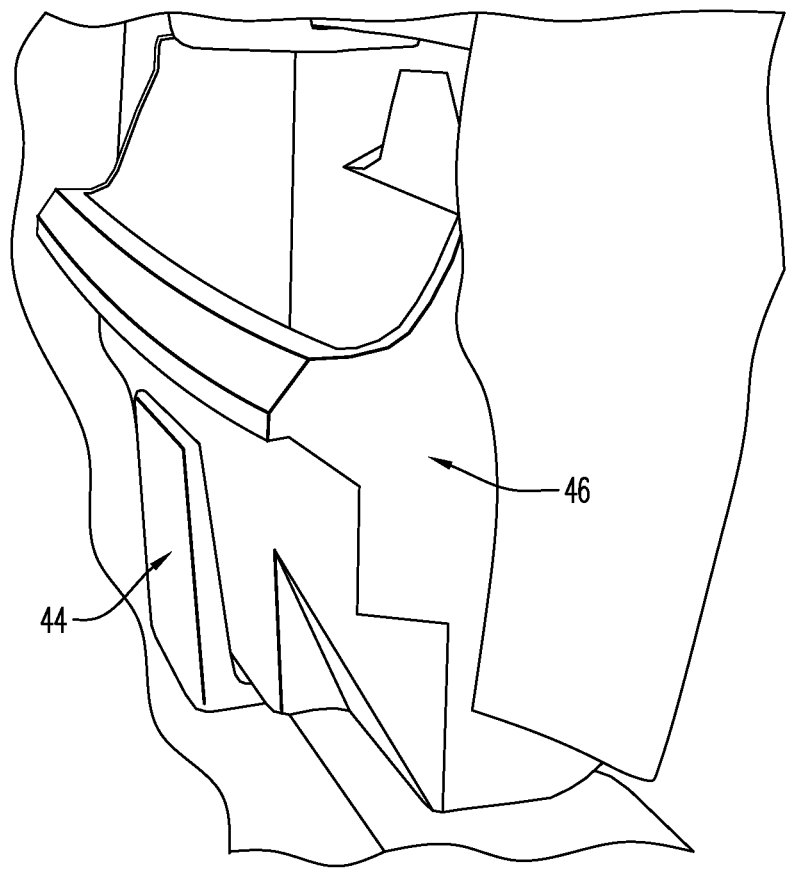
FIG. 10 is a close up rear view of a dust pan holder portion of the cleaning cart of FIG. 7 having a dust pan stored therein.
Figure 11:
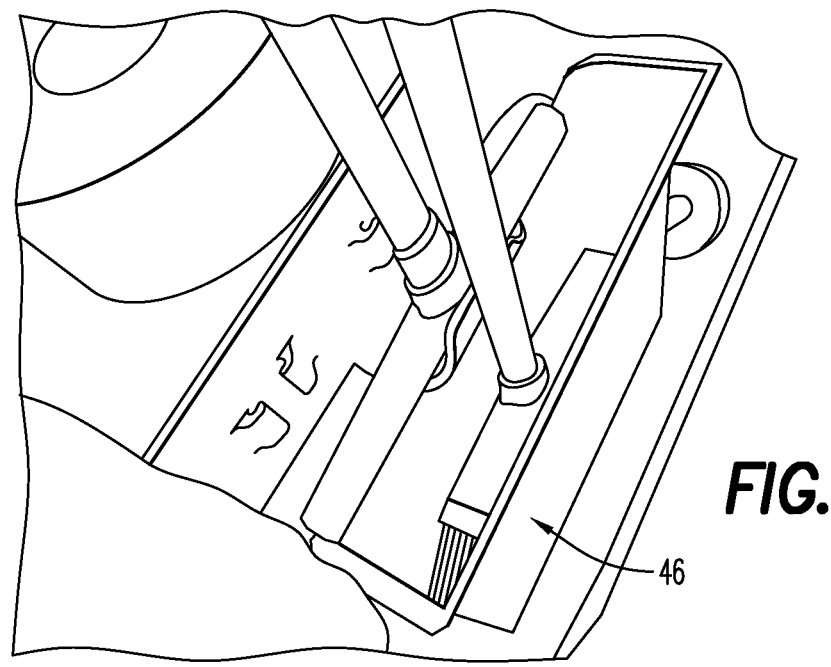
FIG. 11 is a close up front view of a dust pan holder portion of the cleaning cart of FIG. 7 having a dust pan stored therein.

A second type of holder 16 is shown in FIGS. 10 and 11, where the holder is a dust pan holder portion 44. The dust pan holder portion 44 is shown in FIGS. 10 and 11b having a dust pan 46 stored therein.

Figure 7:
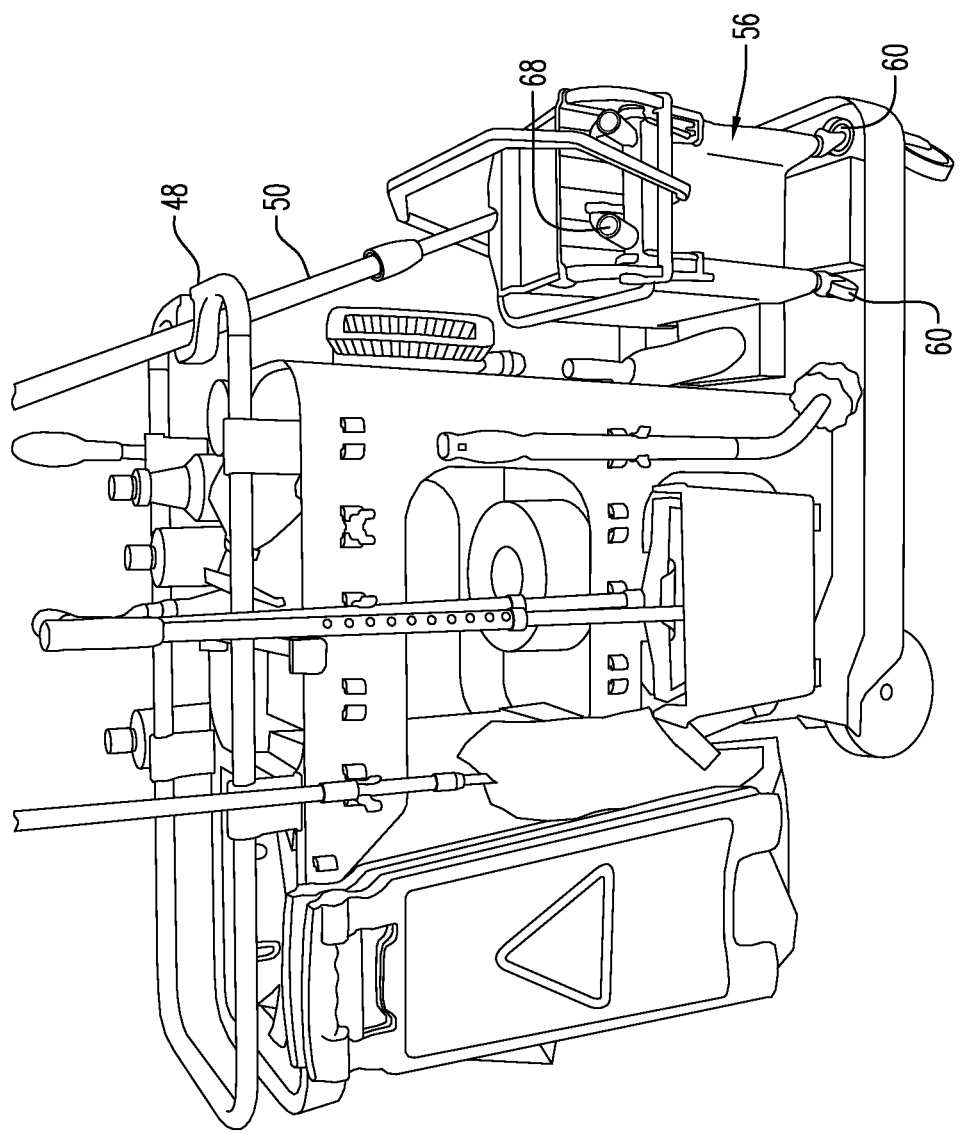
FIG. 7 is a top, side perspective view of an alternate embodiment of a cleaning cart according to the present disclosure having tools thereon.

Another type of holder 16 is shown in FIGS. 1 and 7, where the holder is a mop handle holder portion 48. The mop handle holder portion 48 is shown FIG. 1 without a mop handle 50, but is shown in FIG. 7 with the mop handle 50 received therein. Mop holder portion 48 is shown as being formed in an upper rail 82 of cart 10. However, it is also contemplated for mop holder portion 48 to be separate from the hand rail portion. Here, the mop holder portion 48 can be connected to one or more openings 54 in the manner described in more detail below.

Figure 12:
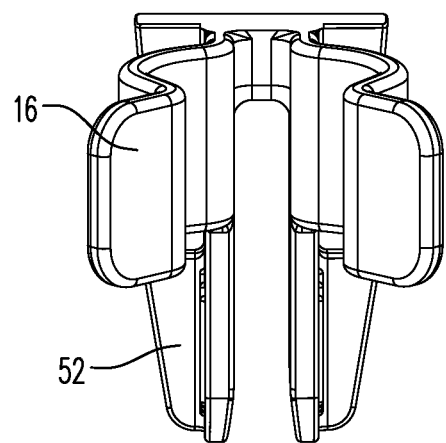
FIG. 12 is a close up view of a first tool clip for use with the cleaning cart of FIG. 7.
Figure 13:
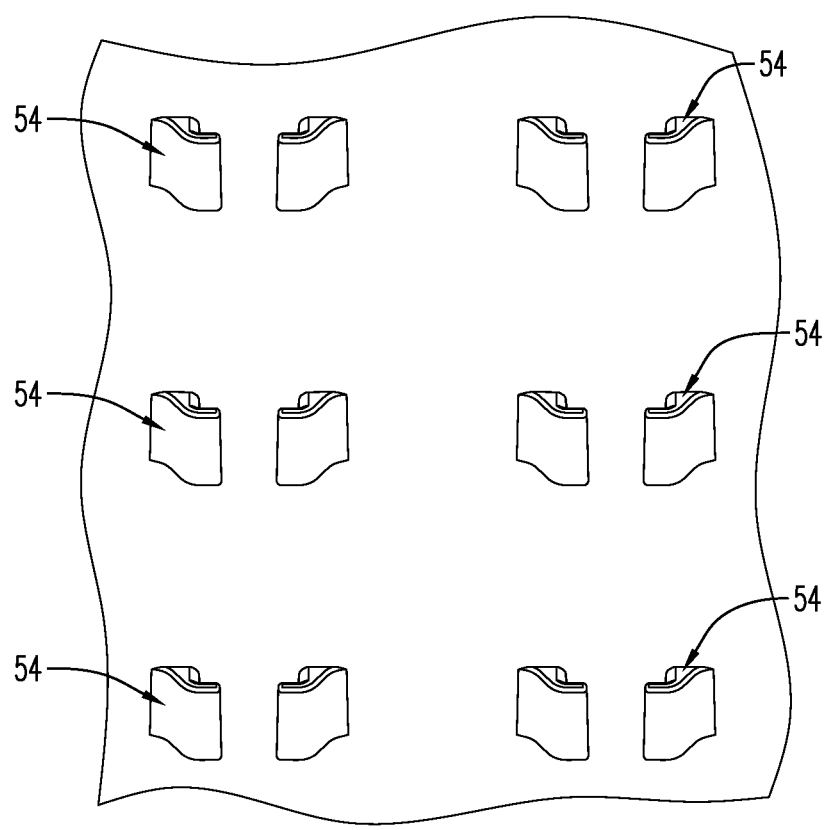
FIG. 13 is a close up view of a tool holder opening for use with the tool clip of FIG. 12.

Still another type of holder 16 is shown in FIG. 12. Here, the holder is a clip style holder having a locking member 52 that is received in an opening 54 in the cart 10 shown in FIG. 13.

In the illustrated embodiment, opening 54 is a dovetail shaped opening in which a corresponding reverse dovetail shaped portion of holder 16 is received in a press, snap, interference, or friction fit manner. Of course, other types of connection are contemplated. Locking member 52, when present, is resiliently biased to an outer position that is larger than the opening 54. During installation or removal, opening 54 acts on the locking member 52 to deflect the locking member to allow the holder 16 to be inserted into the opening. Upon releasing the locking member 52 when fully installed, it returns under its own resilience to its unbiased position securing the locking member in place. Upon removal, the user can deflect the locking member 52 to allow the locking member to be withdrawn from opening 54. It should be recognized that locking member 52 is described above by way of example as requiring deflection to unlock/install. Of course other configurations for member 52 that lock holder 16 in opening 54 are contemplated by the present disclosure.

For example, it should be recognized that opening 54 is illustrated by way of example only as being perpendicular to the floor. However, it is contemplated by the present disclosure for openings 54 to be perpendicular to the floor, parallel to the floor, any angle in relation to the floor, and any combinations thereof.

The opening 54 can be molded directly into cart 10, can be attached by any desired method to the cart, and combinations thereof. Moreover, it should be recognized that opening 54 is described by way of example only as having a dovetail shape. Of course, any complimentary shape of opening 54 and holder 16 are contemplated by the present disclosure.

In this manner, holder 16 can be lockably secured in opening 54 as desired. In this embodiment, holder 16 can be made of any resiliently flexible material such as, but not limited to, polyoxymethylene (POM).

In some embodiments, cart 10 is configured so that openings 54 have a common spacing between adjacent openings. In this manner, holders 16 can be configured that span and be connected with more than one opening 54.

Figure 14:
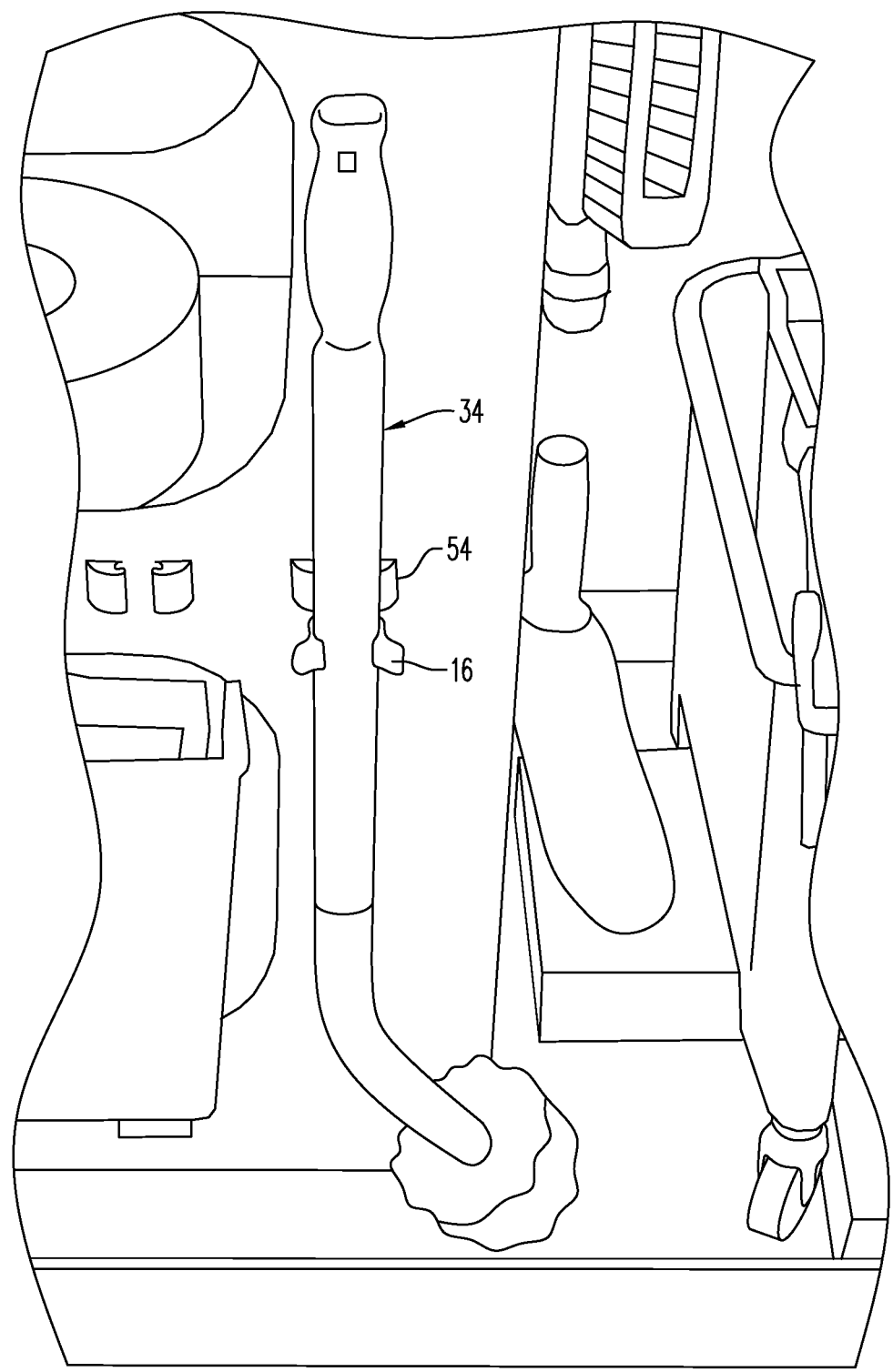
FIG. 14 is a close up view of a tool clip for use with the cleaning cart of FIG. 7.

Tool holder 16 is shown in the embodiments of FIG. 14 in use with a tool 34.

Figure 15A:
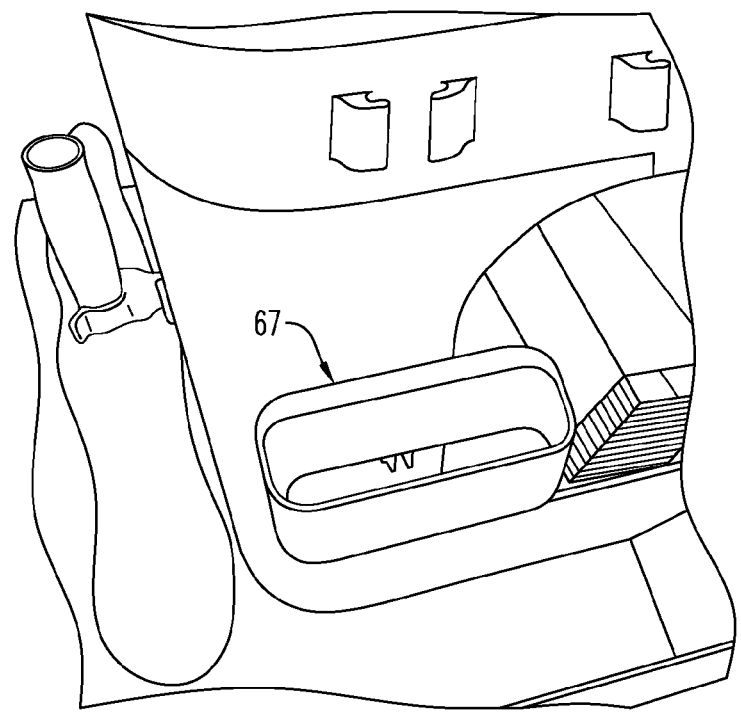
FIGS. 15a and 15b are close up views of a tool clip for use with the cleaning cart of FIG. 7 before and during use, respectively.
Figure 15B:
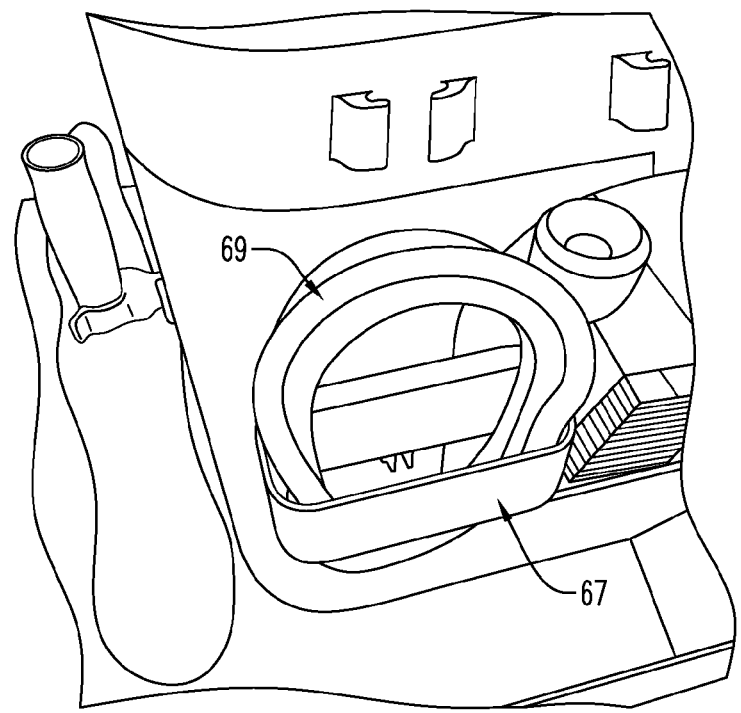

Still another type of holder 15 is shown in FIGS. 15a and 15b. Here, the holder is a hose retaining device 67, shown before insertion of a hose 69.

Figure 16A:
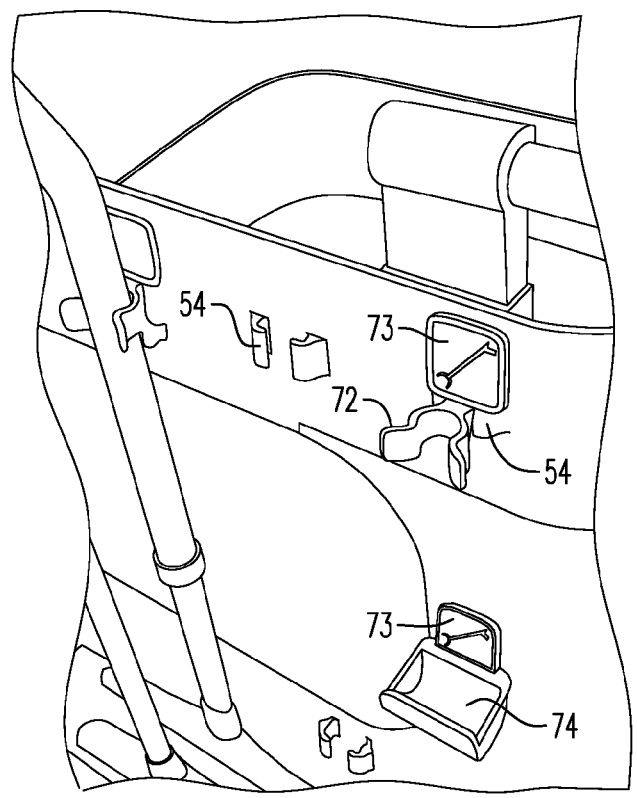
FIGS. 16a and 16b are close up views of another tool clip for use with the cleaning cart of FIG. 7 before and during use, respectively.
Figure 16B:
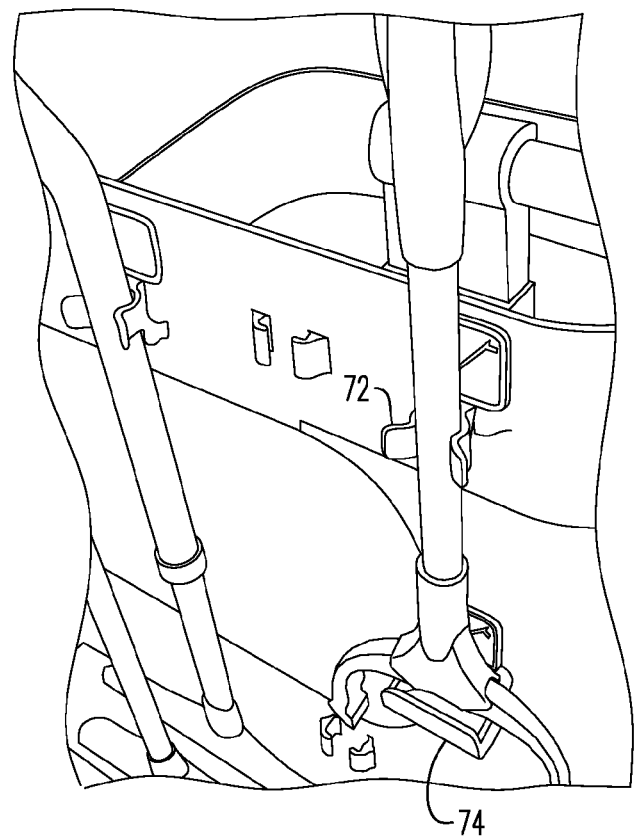

It has been determined by the present disclosure that certain types of cleaning tools, such as that shown in FIGS. 16a and 16b are best held using a combination of tool holders. Thus, in FIGS. 16a and 16b a combination of tool retaining devices 72 and 74 are shown before use, during tool installation, and after tool installation, respectively. Here, the bottom device 74 acts as a vertical support surface while the top device 72 acts as a horizontal retainer for the tool to make it easier for the user to insert the tool into the holder with one hand, as well as to prevent the tool from sliding down the tool holder. The embodiment shown in FIGS. 16a and 16b illustrate multiple tool holders that are positioned at different vertical levels on cart 10. Of course, it is contemplated by the present disclosure for the multiple tool holders to be at different horizontal positions, different vertical positions, and any combinations thereof.

Figure 17A:
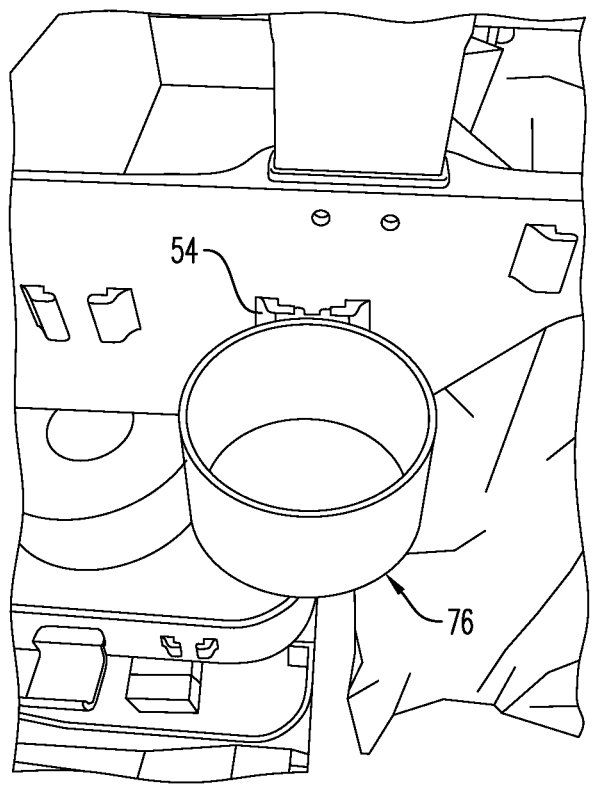
FIGS. 17a and 17b are close up views of another tool clip for use with the cleaning cart of FIG. 7 before and during use, respectively.
Figure 17B:
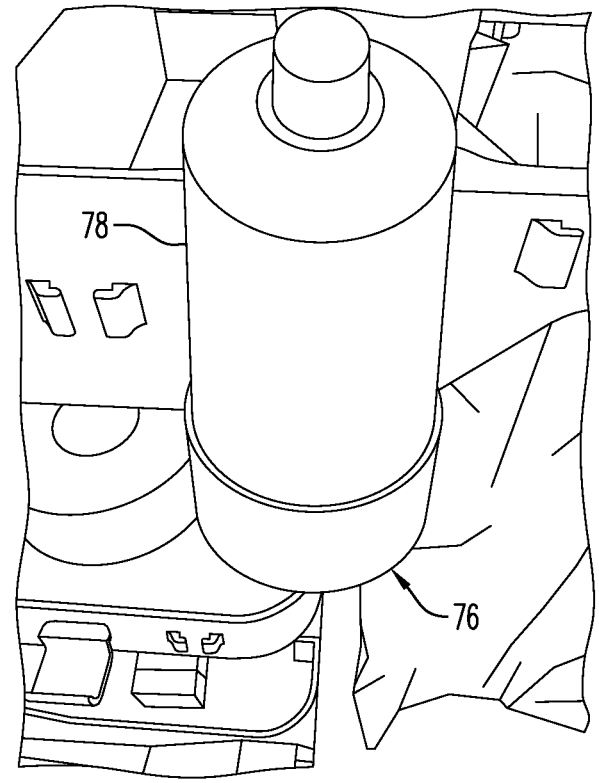

Another type of holder 16 is shown in FIGS. 17a and 17b. Here, the holder is a bottle retaining device 76, shown in FIG. 17a before insertion of a bottle 78 and in FIG. 17b after insertion of the bottle.

Figure 18A:
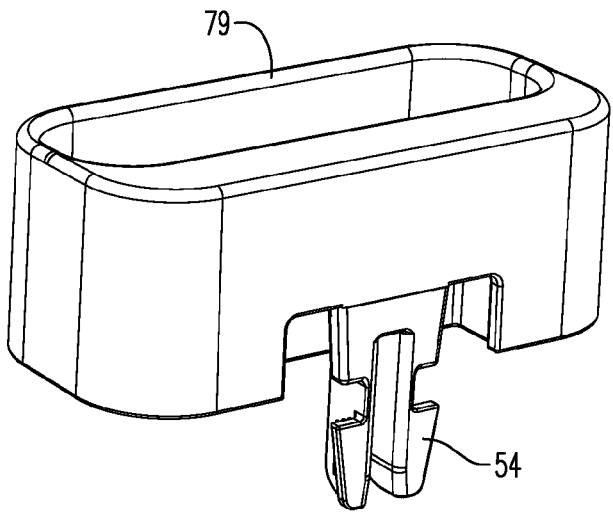
FIGS. 18a, 18b, and 18c are close up views of other tool clips for use with the cleaning cart of FIG. 7.
Figure 18B:
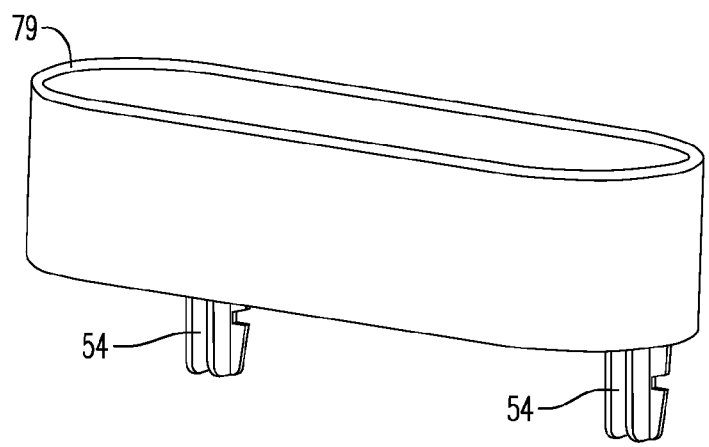
Figure 18C:
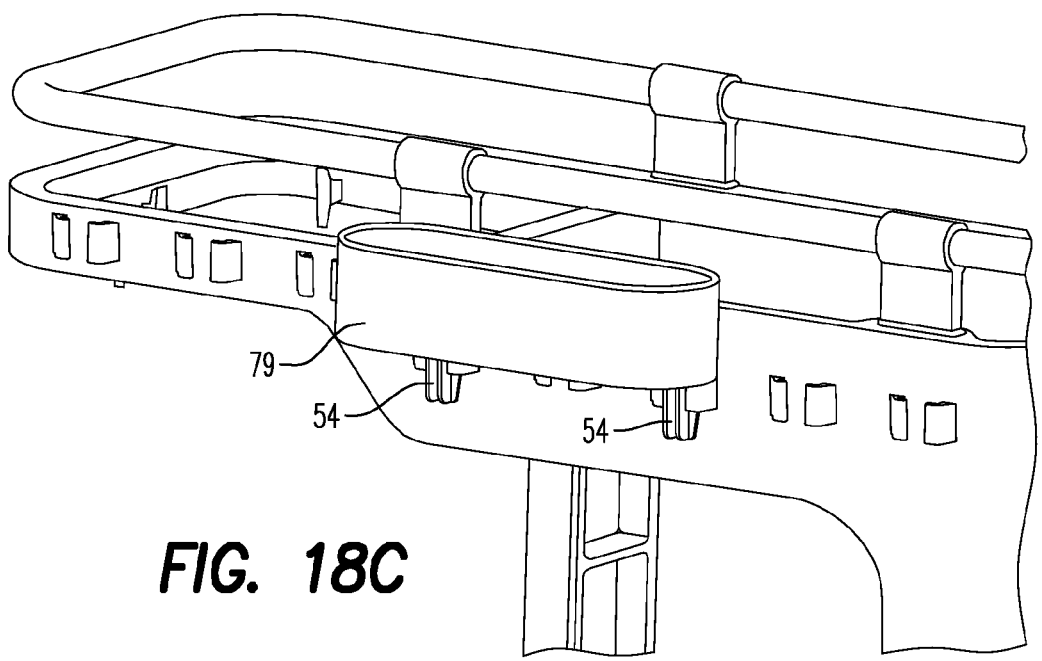

Still another type of holder 16 is shown in FIGS. 18a through 18c. Here, the holder is a shelf 79. As discussed above, an unintended consequence of the configuring of cart 10 is the reduction in storage space for supplies. Advantageously, shelf 79 can be positioned as desired on the cart to recapture at least some of the lost storage space. In FIG. 18a, shelf 79 has a single dovetail shaped portion that mates in opening 54, while in FIGS. 18b and 18c the shelf 79 has two dovetail shaped portions that mate with two openings 54. It should be recognized that it is contemplated by the present disclosure for any of the tool holders 16 disclosed herein to have any desired number of dovetail shaped portions that mate with a corresponding number of openings 54.

Figure 19C:
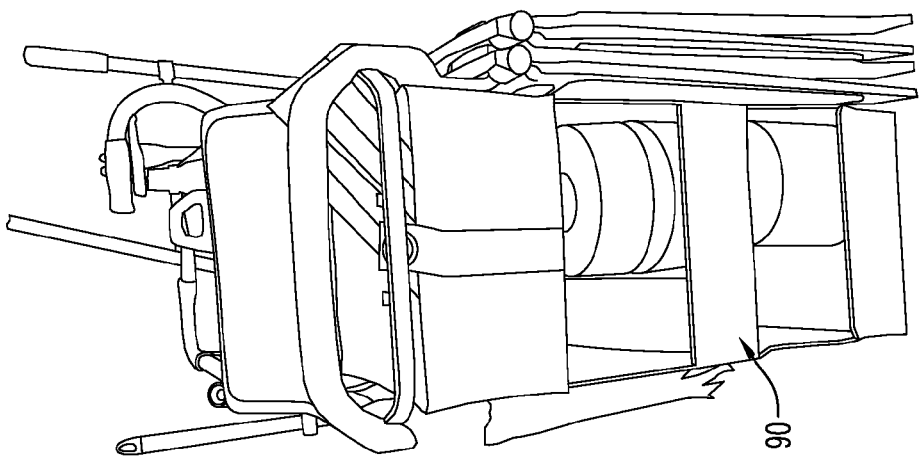

Cart 10 is illustrated in use with a soft storage bag 90 as shown in FIGS. 19a and 19c and in use with a trash receptacle 90 as shown in FIG. 19b. Cart 10 is configured to interchangeably receive the soft storage bag 90 or the trash receptacle 92, as needed.

In some embodiments, soft storage bag 90 can be configured with a small trash receptacle incorporated therein such as on an upper portion or a lower portion, which allows the combination of storage and trash functionality, shown in FIG. 19c.

The trash receptacle 92 of FIG. 19b can be configured to receive trash directly therein. However in other embodiments, trash receptacle 92 can receive a disposable trash bag (not shown) therein for receipt of the trash. It has been determined by the present disclosure that during removal of a bag full of trash from receptacle 92, the receptacle can in prior art carts be disconnected from the cart.

Figure 20B:
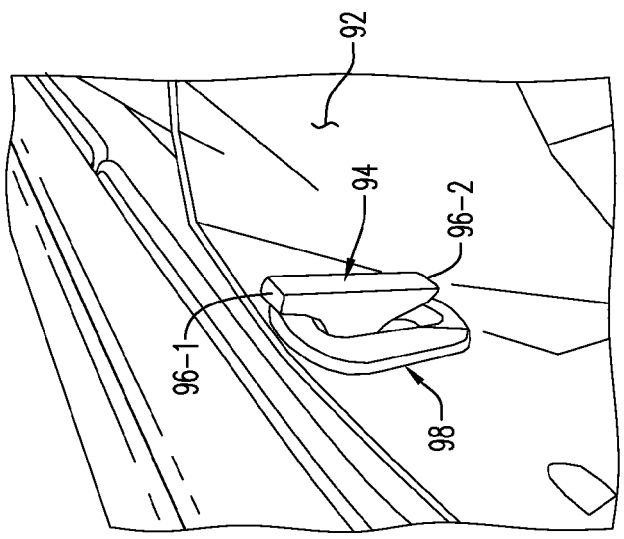
FIGS. 20a and 20b are views of a trash receptacle connector of cart of FIG. 7, before and during use, respectively.
Figure 20A:
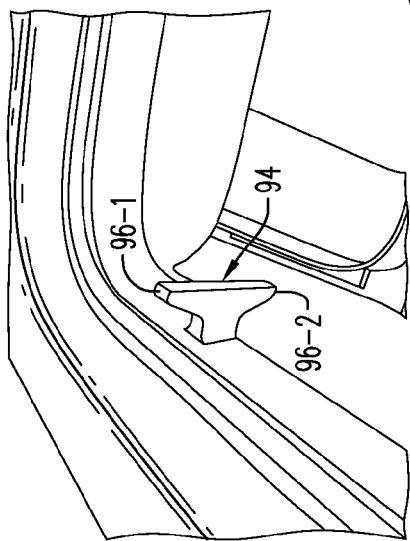

Advantageously, cart 10 includes a connection that prevents the receptacle 92 from becoming undesirably disconnected from the cart during removal of trash bags as shown in FIGS. 20a and 20b. This connection also finds use with bag 90 so that the bag and receptacle 92 are interchangeable.

Here, cart 10 includes a number of elongated tabs 94 that have both an upper arm 96-1 and a lower arm 96-2. Further, receptacle 92 has an eyelet 98 in which one of the tabs 94 is received. It has been determined by the present disclosure that the combination of the elongated tabs 92, with upper and lower arms 96-1, 96-2, in combination with eyelet 98 mitigate instances where the forces induced on the connection are sufficient to dislodge receptacle 92 from cart 10 during removal of full trash bags from the receptacle. Eyelet 98 can be elongated or ovoid as shown, or can have any desired shape such as but not limited to circular, rectangular, square, and others.

It should be recognized that tabs 94 are shown and described above by way of example only as having elongated arms at the upper and lower ends. It is also contemplated by the present disclosure for tabs 94 to have elongated arms at one or more sides in addition to or instead of at the upper and lower sides as seen in FIGS. 1 through 6.

In some instances, the user may want to configure cart 10 without mop bucket 56. Here, the user may wish to install the soft storage bag of FIG. 19 but also provide a trash receptacle. Thus, FIGS. 20 and 21 illustrate alternate embodiments for installing a trash receptacle 100 on cart 10 instead of bucket 56.

Figure 21C:
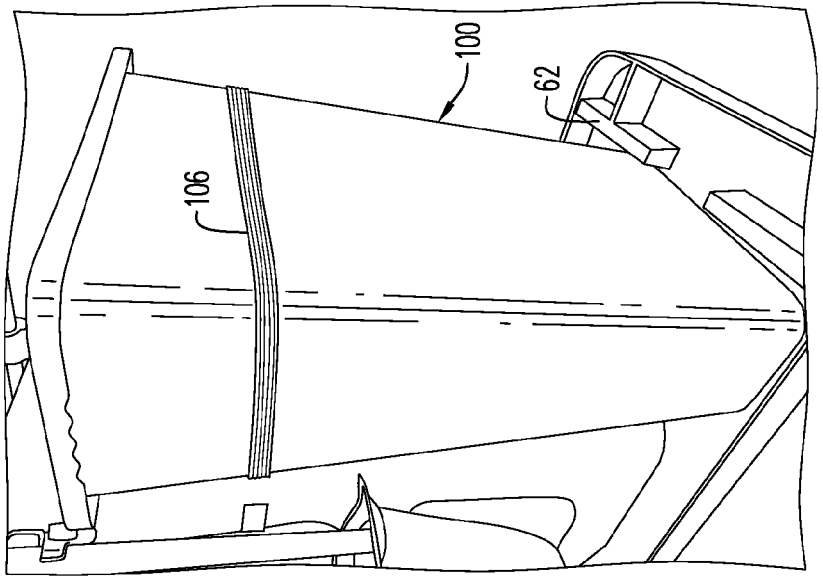
FIGS. 21a, 21b, and 21c are views of a first embodiment of a trash receptacle for use with the cart of FIG. 7.
Figure 21B:
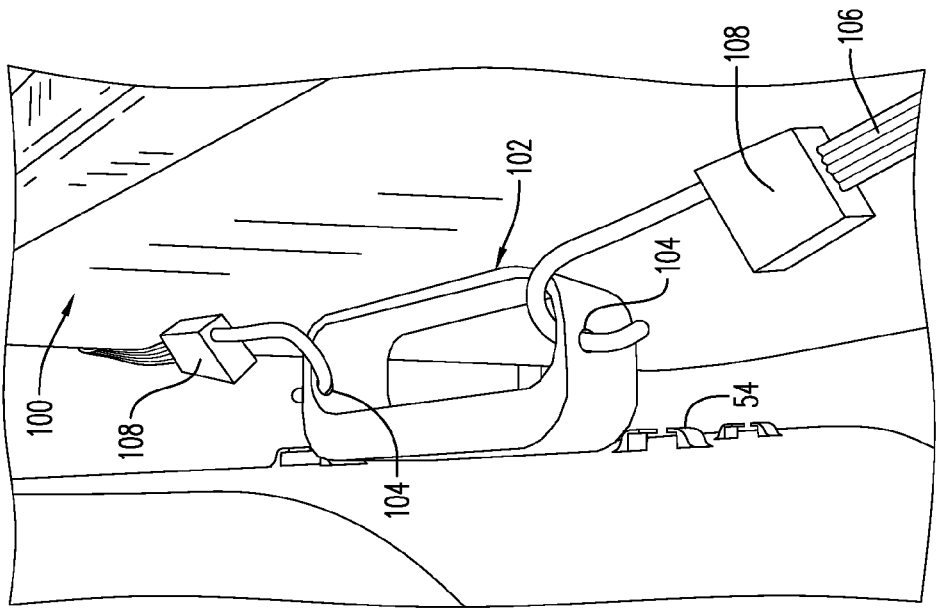
Figure 21A:
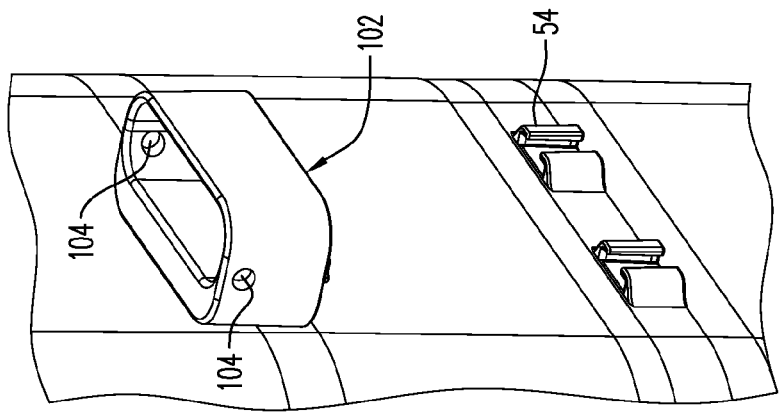

In the embodiment of FIGS. 21a, 21b, and 21c, cart 10 includes a trash receptacle holder 102. Holder 102 releasably mates with opening 54 in the manner discussed above. Holder 102 includes a pair of locking holes 104. In use, the user places trash receptacle 100 on base 12 behind rear restraining wall 62 and secures an upper open end of the receptacle to cart 10 using an elastic cord 106, commonly known as a bungle cord, by securing ends 108 of the cord 106 to locking holes.

Figure 22C:
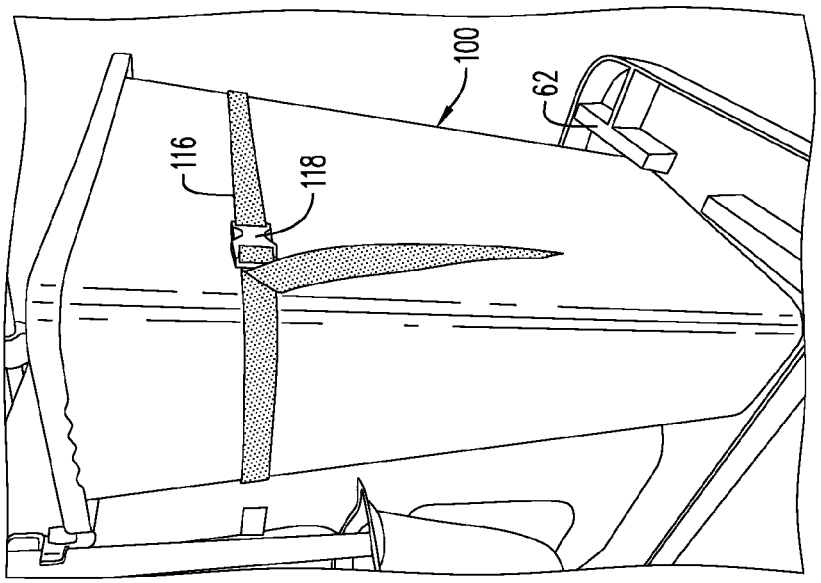
FIGS. 22a, 22b, and 22c are views of a second embodiment of a trash receptacle for use with the cart of FIG. 7.
Figure 22B:
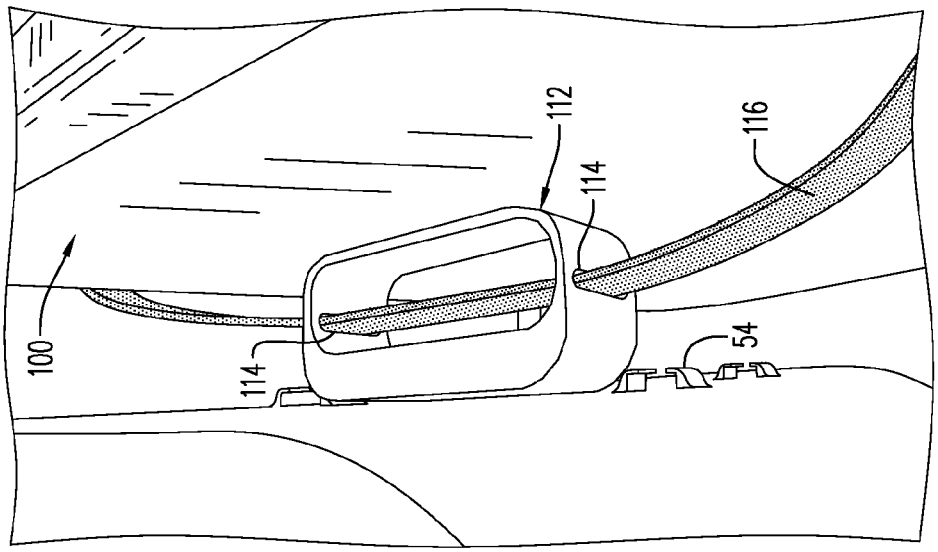
Figure 22A:
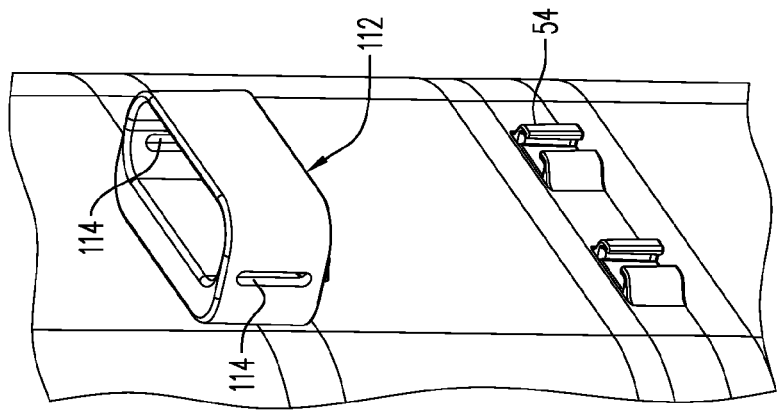

In the embodiment of FIGS. 22a, 22b, and 22c, cart 10 includes a trash receptacle holder 112. Holder 112 also releasably mates with opening 54 in the manner discussed above. Holder 112 includes a pair of strap holes 114. In use, the user places trash receptacle 100 on base 12 behind rear restraining wall 62 and secures an upper open end of the receptacle to cart 10 using a tightenable strap 116 by securing ends 118 of the strap to one another.

Advantageously, cart 10—through the incorporation of openings 54 and the various tool holders 16—allow the cart to be customized to each particular use and set of tools for that particular use.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the entire disclosure.

What is claimed is:

1. A cleaning cart, comprising:
   a base having a first side wall, a second side wall, and a front wall, the base having at least one portion configured to receive a bucket thereon;
   a plurality of wheels depending from the base;
   a storage region depending from the base; and
   a bucket restraining device having a lateral restraining wall and a rear restraining wall that cooperate to define a first restraining region and a second restraining region,
   the first restraining region being defined by the first side wall, the front wall, the lateral restraining wall, and a portion of the rear restraining wall, and
   the second restraining region being defined by the second side wall, the front wall, the lateral restraining wall, and a different portion of rear restraining wall.

2. The cleaning cart of claim 1, wherein the first restraining region is sized and positioned to receive two wheels of the bucket when received on the base.

3. The cleaning cart of claim 1, wherein the second restraining region is sized and positioned to receive only one wheel of the bucket when received on the base.

4. The cleaning cart of claim 1, wherein the storage region that has a main region with a first width and the base has a second width, the second width being larger than the first width.

5. The cleaning cart of claim 4, wherein the storage region has a rear portion region with a third width, the third width being larger than the first width but smaller than the second width, the rear portion having a push handle.

6. The cleaning cart of claim 4, further comprising an upper rail depending from the storage region.

7. The cleaning cart of claim 6, wherein the upper rail comprises a mop handle holder portion defined therein.

8. The cleaning cart of claim 6, wherein the upper rail extends forward from the storage region in a direction of the front wall defining a pull handle.

9. The cleaning cart of claim 4, wherein the storage region comprises a plurality of dovetail openings configured to releasably receive a tool holder therein.

10. The cleaning cart of claim 1, wherein the lateral restraining wall is movably positioned to allow adjustment in a size of the first restraining region and/or the second restraining region.

11. A cleaning cart, comprising:
    a base;
    a plurality of wheels depending from the base; and
    a storage region depending from the base,
    wherein the storage region has a main region with a first width and the base has a second width, the second width being larger than the first width to define a gutter on at least opposing sides of the storage region, and
    wherein the storage region has a rear portion region with a third width, the third width being larger than the first width but smaller than the second width.

12. The cleaning cart of claim 11, wherein the gutter is further defined in front of the storage region.

13. The cleaning cart of claim 11, wherein the rear portion region of the storage region comprises a push handle.

14. The cleaning cart of claim 13, further comprising an upper rail depending from the storage region.

15. The cleaning cart of claim 14, wherein the upper rail comprises a mop handle holder portion defined therein.

16. The cleaning cart of claim 14, wherein the upper rail extends forward from the storage region in a direction of a front wall of the base and defines a pull handle.

17. The cleaning cart of claim 11, wherein the storage region comprises a plurality of dovetail openings configured to releasably receive a tool holder therein.

18. The cleaning cart of claim 17, further comprising one or more tool holders received in the plurality of dovetail openings, the tool holders being configured to hold tools above the gutters.

19. The cleaning cart of claim 11, further comprising a bucket restraining device having a lateral restraining wall and a rear restraining wall that cooperate to define a first restraining region and a second restraining region,
    the first restraining region being defined by a first side wall of the base, a front wall of the base, the lateral restraining wall, and a portion of the rear restraining wall, and the second restraining region being defined by a second side wall, the front wall, the lateral restraining wall, and a different portion of rear restraining wall.

20. The cleaning cart of claim 19, wherein the first restraining region is sized and positioned to receive two wheels of a bucket when received on the base.

21. The cleaning cart of claim 19, wherein the second restraining region is sized and positioned to receive only one wheel of a bucket when received on the base.

22. A cleaning cart, comprising:
a base having a floor, a set of side walls, and a front wall;
a plurality of wheels depending from the base;
a storage region depending from the floor of the base so as to define a continuous gutter between opposite sides of the storage region and the set of side walls and between a front of the storage region and the front wall;
a plurality of tool holder openings on the storage region; and
a tool holder removably securable in any one of the plurality of tool holder openings.

23. The cleaning cart of claim 22, further comprising at least one tool holder removably positioned simultaneously in two of the plurality of tool holder openings.

24. The cleaning cart of claim 22, wherein the plurality of tool holder openings are at different horizontal and vertical levels on the storage region.

25. The cleaning cart of claim 22, wherein the plurality of tool holder openings are integrally molded on the storage region.

26. The cleaning cart of claim 22, wherein the tool holder comprises an extended surface with at least one of a label, an icon, and a tool name on the extended region.

27. The cleaning cart of claim 22, wherein the floor slopes toward the front wall.

28. The cleaning cart of claim 27, further comprising a removable drain plug at or near the front wall.

29. The cleaning cart of claim 27, further comprising a sloped region defined over a rear set of the plurality of wheels, the sloped region sloping towards the front wall.

* * * * *